US007542250B2

(12) United States Patent
Premerlani et al.

(10) Patent No.: US 7,542,250 B2
(45) Date of Patent: Jun. 2, 2009

(54) MICRO-ELECTROMECHANICAL SYSTEM BASED ELECTRIC MOTOR STARTER

(75) Inventors: William James Premerlani, Scotia, NY (US); Fengfeng Tao, Clifton Park, NY (US); Joshua Isaac Wright, Arlington, VA (US); Kanakasabapathi Subramanian, Clifton Park, NY (US); John Norton Park, Rexford, NY (US); Robert Joseph Caggiano, Wolcott, CT (US); David James Lesslie, Plainville, CT (US); Brent Charles Kumfer, Fort Wayne, IN (US); Charles Stephan Pitzen, Farmington, CT (US); Kathleen Ann O'Brien, Albany, NY (US); Edward Keith Howell, Hendersonville, NC (US)

(73) Assignee: General Electric Company, Niskayuna, NY (US)

( * ) Notice: Subject to any disclaimer, the term of this patent is extended or adjusted under 35 U.S.C. 154(b) by 316 days.

(21) Appl. No.: 11/621,623

(22) Filed: Jan. 10, 2007

(65) Prior Publication Data

US 2008/0165457 A1 Jul. 10, 2008

(51) Int. Cl.
*H02H 7/00* (2006.01)

(52) U.S. Cl. ....................... 361/2; 361/1; 361/3; 361/8; 361/13; 361/4; 361/31

(58) Field of Classification Search ..................... 361/2, 361/3, 8, 13, 31, 1, 4
See application file for complete search history.

(56) References Cited

U.S. PATENT DOCUMENTS

| | | | | | |
|---|---|---|---|---|---|
| 3,496,409 | A | | 2/1970 | Connell | |
| 3,809,959 | A | | 5/1974 | Pucher | |
| 4,420,784 | A | * | 12/1983 | Chen et al. | 361/7 |
| 4,500,934 | A | | 2/1985 | Kinsinger | |
| 4,700,256 | A | * | 10/1987 | Howell | 361/13 |
| 4,723,187 | A | | 2/1988 | Howell | |
| 5,164,872 | A | | 11/1992 | Howell | |
| 5,374,792 | A | | 12/1994 | Ghezzo et al. | |
| 5,430,597 | A | | 7/1995 | Bagepalli et al. | |
| 6,563,683 | B1 | | 5/2003 | Strumpler | |
| 6,738,246 | B1 | | 5/2004 | Strumpler | |
| 6,760,202 | B1 | | 7/2004 | Meyer et al. | |
| 2003/0183838 | A1 | | 10/2003 | Huang et al. | |
| 2005/0146404 | A1 | | 7/2005 | Yeatman | |
| 2005/0146814 | A1 | * | 7/2005 | Sellier et al. | 361/8 |
| 2006/0187688 | A1 | | 8/2006 | Tsuruya | |
| 2006/0202933 | A1 | * | 9/2006 | Pasch et al. | 345/94 |
| 2007/0139829 | A1 | * | 6/2007 | Arthur et al. | 361/2 |
| 2007/0139830 | A1 | | 6/2007 | Premerlani | |

* cited by examiner

*Primary Examiner*—Rita Leykin
(74) *Attorney, Agent, or Firm*—Paul J. DiConza

(57) ABSTRACT

A motor starter is provided. The motor starter includes micro-electromechanical system switching circuitry. The system may further include solid state switching circuitry coupled in a parallel circuit with the electromechanical switching circuitry, and a controller coupled to the electromechanical switching circuitry and the solid state switching circuitry. The controller may be configured to perform selective switching of a load current from a motor connected to the motor starter. The switching may be performed between the electromechanical switching circuitry and the solid state switching circuitry in response to a load current condition appropriate to an operational capability of a respective one of the switching circuitries.

28 Claims, 11 Drawing Sheets

MICRO-ELECTROMECHANICAL SYSTEM BASED ELECTRIC MOTOR STARTER

BACKGROUND

Embodiments of the invention relate generally to electromotive control, and, more particularly, to micro-electromechanical system (MEMS) based motor starter, such as may be used for controlling motor operation and protecting the motor from overload and/or fault conditions.

In the field of motor control, a conventional motor starter may consist of a contactor and a motor overload relay. The contactor is typically a three-pole switch, which is usually operated by a continuously energized solenoid coil. Since the contactor controls the operation of the motor, i.e., the starting and stopping, this device is generally rated for many thousands of operations.

The overload relay generally provides overload protection to the motor from overload conditions. Overload conditions can occur, for example, when equipment is operated in excess of normal full-load rating, e.g., when conductors carry current in excess of the applicable ampacity ratings. Overload conditions persisting for a sufficient length of time will damage or overheat the equipment. The terms “overload,” “overload protection” and “overload relay” are well-understood in the art. See, for example, National Electrical Manufacturers Association (NEMA) standard ICS2, which is herein incorporated by reference.

To protect a motor from faults requiring instantaneous protection (such as short circuit faults, ground faults), circuit breakers, e.g. instantaneous trip circuit breakers, are typically used. Additionally these circuit breakers may function as a manual disconnect switch (disconnect), which serve to isolate the motor during a maintenance operation.

Devices which combine the instantaneous protection of a circuit breaker as well as the motor starter functions in a single enclosure are known in the art as combination starters. However, the current-carrying components of instantaneous trip circuit breakers are constructed of heavy copper bars and large-sized tungsten contacts. For example, the copper bars/contacts may be over-designed to survive short circuit faults, however, during a short circuit fault the load may be in parallel with the short and thus such over-design has little effect on the level of short circuit current.

The large size of the components increases the size of the circuit breaker to the extent that such circuit breakers do not fit within certain standard Asian and European circuit breaker enclosures. Moreover, instantaneous trip breakers may include complicated and/or costly mechanical switches that use electromechanical release mechanisms.

As noted above, these conventional circuit breakers are large in size thereby necessitating use of a large force to activate the switching mechanism. Additionally, the switches of these circuit breakers generally operate at relatively slow speeds. Furthermore, these circuit breakers are burdensomely complex to build and thus expensive to fabricate. In addition, when contacts of the switching mechanism in conventional circuit breakers are physically separated, an arc is typically formed there between which continues to carry current until the arc is extinguished naturally. Moreover, energy associated with the arc leads to degradation of the contacts and/or can raise other undesirable conditions in certain types of environments, such as near a flammable gas or material.

As an alternative to slow electromechanical switches, relatively fast solid-state switches have been employed in high speed switching applications. As will be appreciated, these solid-state switches switch between a conducting state and a non-conducting state through controlled application of a voltage or bias. For example, by reverse biasing a solid-state switch, the switch may be transitioned into a non-conducting state. However, since solid-state switches do not create a physical gap between contacts when they are switched into a non-conducting state, they experience leakage current. Furthermore, due to internal resistances, when solid-state switches operate in a conducting state, they experience a voltage drop. Both the voltage drop and leakage current contribute to the generation of excess heat under normal operating circumstances, which may be detrimental to switch performance and life.

U.S. patent application Ser. No. 11/314,336 filed on Dec. 20, 2005, which is incorporated by reference in its entirety herein, describes high-speed micro-electromechanical system (MEMS) based switching devices including circuitry and techniques adapted to suppress arc formation between contacts of the micro-electromechanical system switch. The response time of this switching circuitry is in the order of micro-to-nano-seconds (e.g., faster than a conventional fuse or breaker).

In view of the foregoing considerations it would be desirable to provide a motor starter for performing fast current limiting, achieving low let-through current during fault conditions, e.g., substantially lower than may be achieved with conventional motor-protecting technology, such as current limiting fuses or circuit breakers. It would be further desirable to provide a combination motor starter adapted to provide various functionality, such as motor control, fault protection, and overload protection, in an efficiently integrated system.

BRIEF DESCRIPTION

Generally, aspects of the present invention provide a motor starter including electromechanical system (MEMS) switching circuitry. A first over-current protection circuitry may be connected in a parallel circuit with the micro-electromechanical system switching circuitry. The first over-current protection circuitry may be configured to momentarily form an electrically conductive path in response to a first switching event, of the micro-electromechanical system switching circuitry. For example, the first switching event may be a turn-on of the micro-electromechanical system switching circuitry to a conductive state. The electrically conductive path forms a parallel circuit with the micro-electromechanical system switching circuitry for suppressing arc formation between contacts of the micro-electromechanical system switching circuitry during the first switching event.

Further aspects of the present invention provide a motor starter including a micro-electromechanical system switching circuitry. The system may further include solid state switching circuitry coupled in a parallel circuit with the electromechanical switching circuitry. A controller coupled to the electromechanical switching circuitry and the solid state switching circuitry, the controller configured to perform selective switching of a motor load current between the electromechanical switching circuitry and the solid state switching circuitry in response to a motor load current condition appropriate to an operational capability of a respective one of the switching circuitries.

DRAWINGS

These and other features, aspects, and advantages of the present invention will become better understood when the following detailed description is read with reference to the accompanying drawings in which like characters represent like parts throughout the drawings, wherein.

Figure 10:
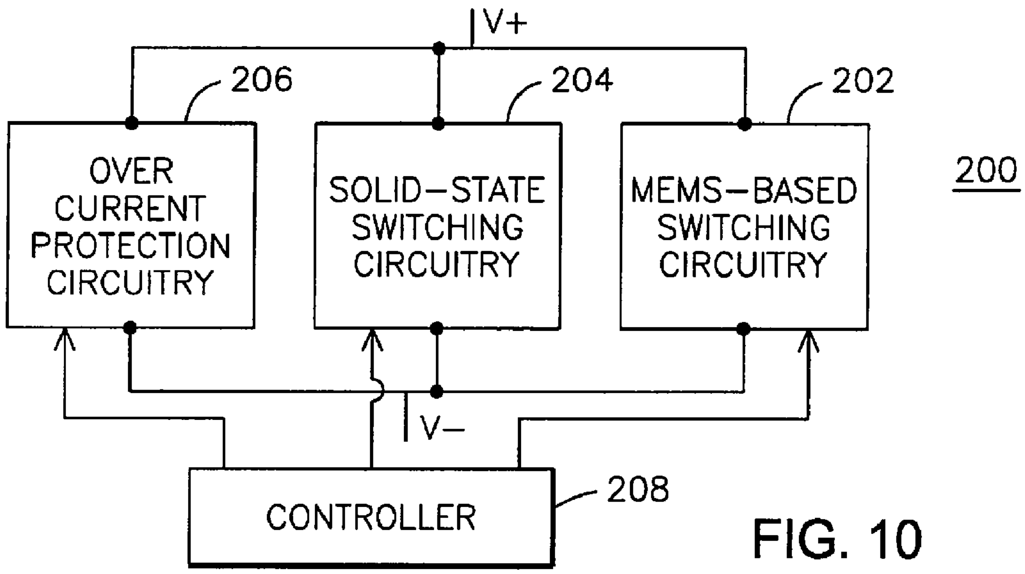
FIG. 10 is a block diagram illustrating an example motor starter, in accordance with aspects of the present invention.
Figure 11:
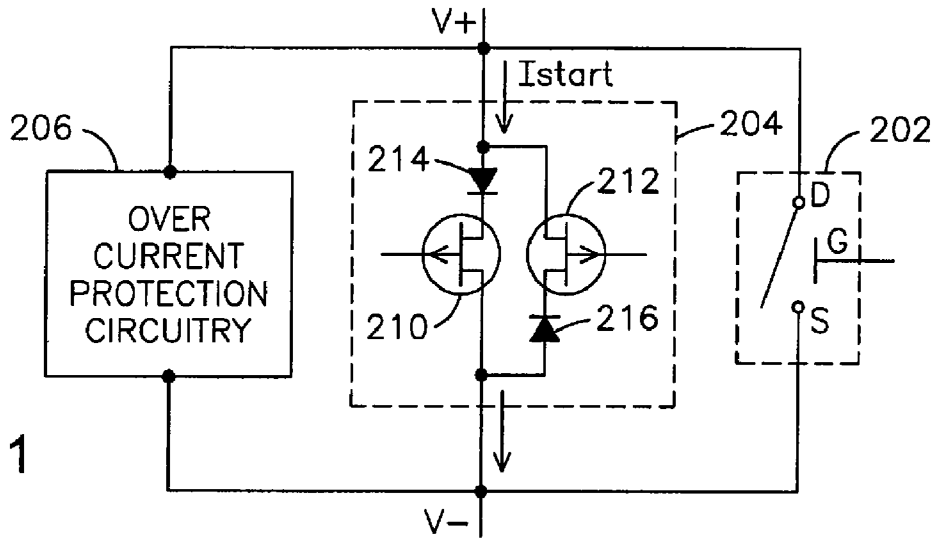
Figure 12:
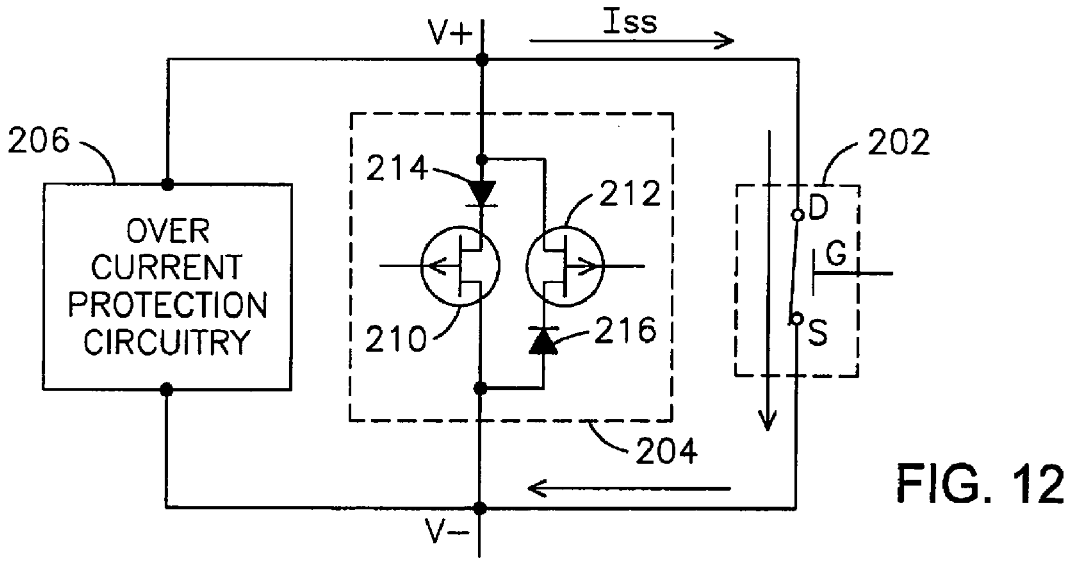
Figure 13:
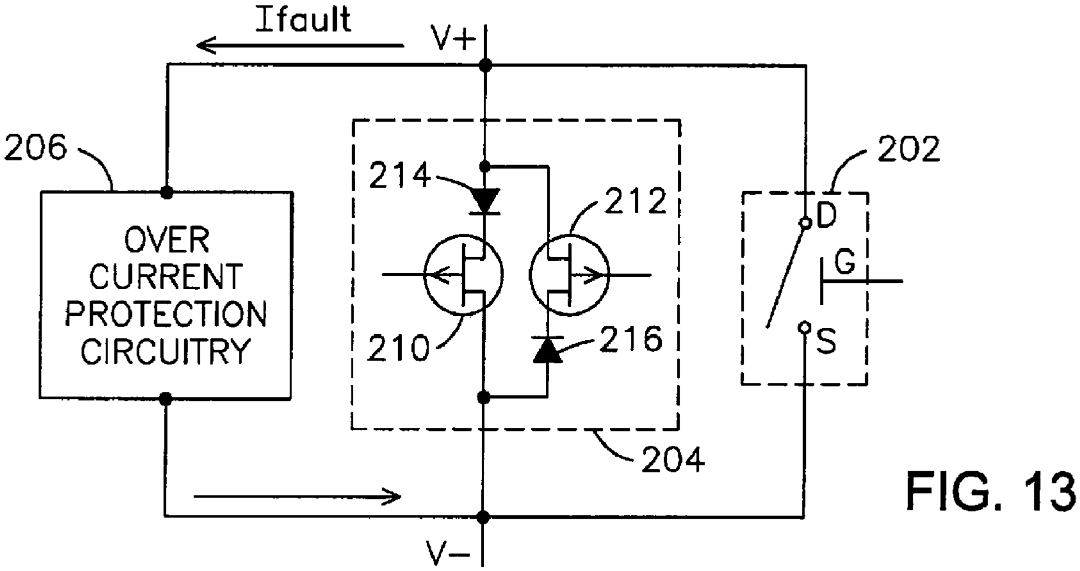

FIGS. 11, 12 and 13 respectively illustrate circuitry details for one example embodiment of the motor starter of FIG. 10, wherein FIG. 11 illustrates a current path through respective solid state switching circuitry, such as during a load starting event, FIG. 12 illustrates a current path through respective MEMS-based switching circuitry, such as during steady state operation, and FIG. 13 illustrates a current path through over-current protection circuitry, such as during a fault condition.

Figure 14:
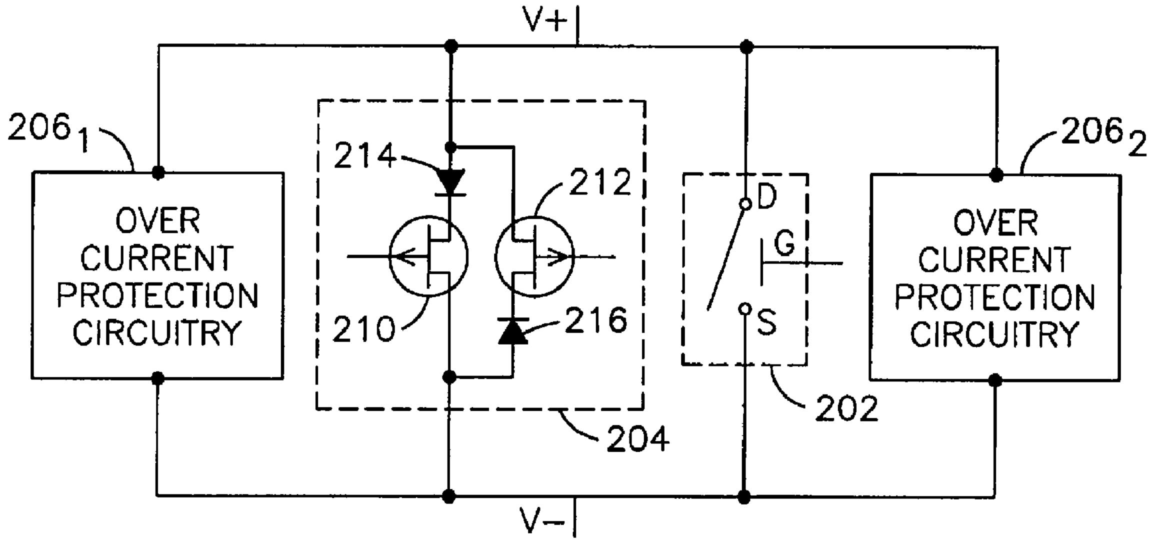

FIG. 14 illustrates a schematic of one example embodiment of a motor starter with dual over-current protection circuitry.

Figure 15:
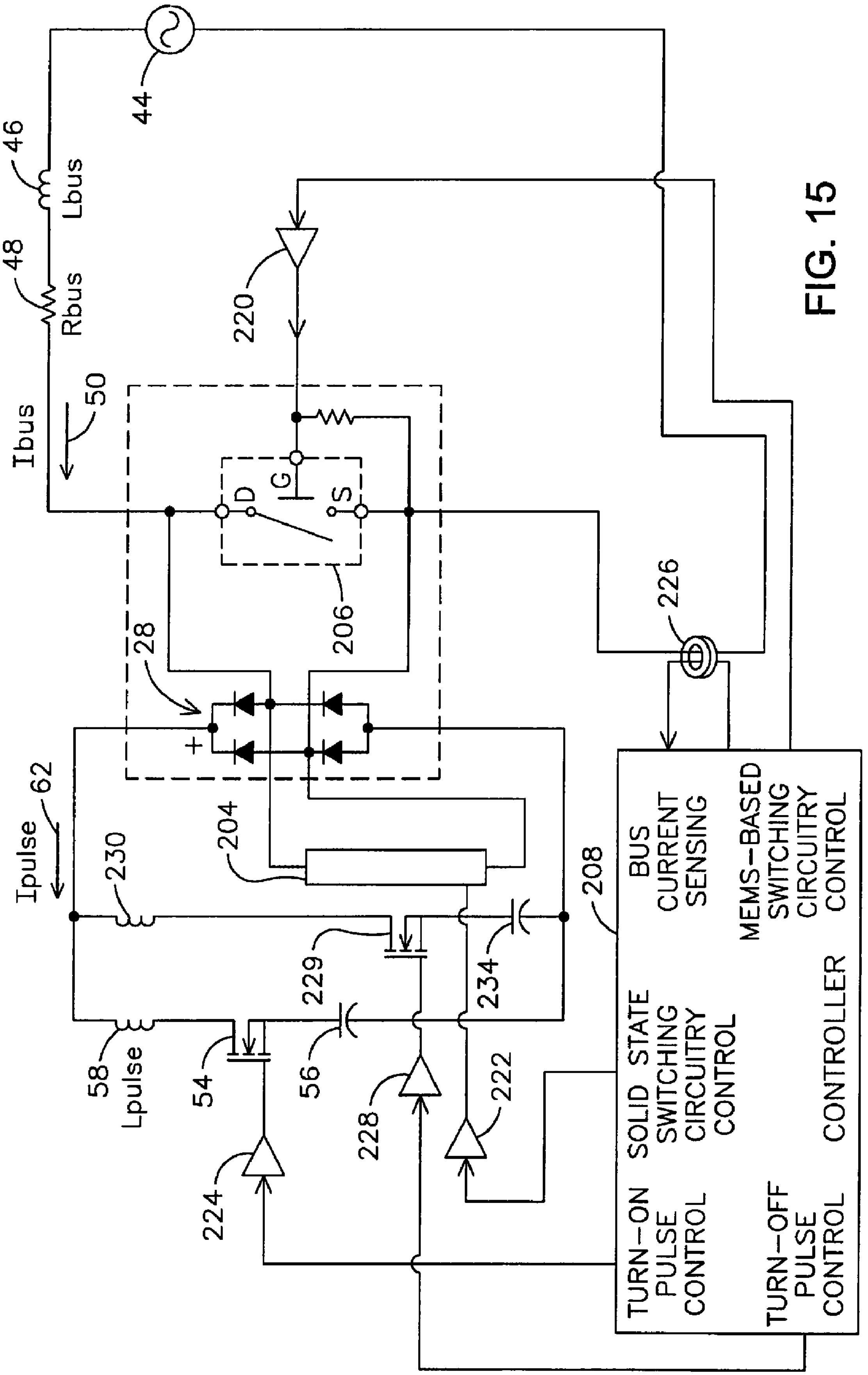

FIG. 15 illustrates circuitry details for one example embodiment of the motor starter of FIG. 10.

Figure 16:
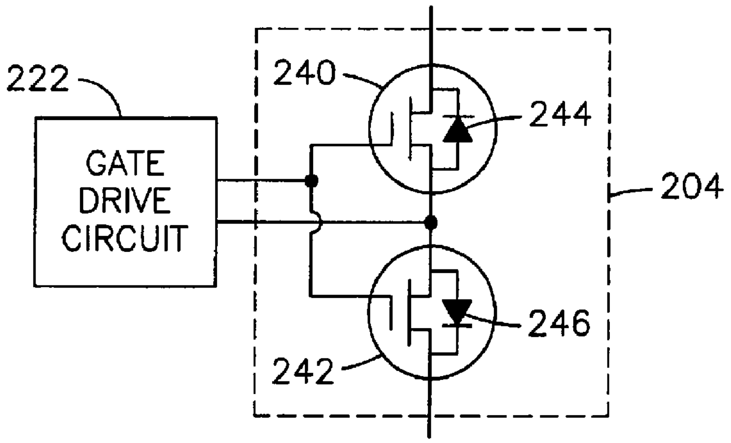

FIG. 16 illustrates an example embodiment wherein solid state switching circuitry comprises a pair of solid state switches connected in an inverse series circuit arrangement.

Figure 17:
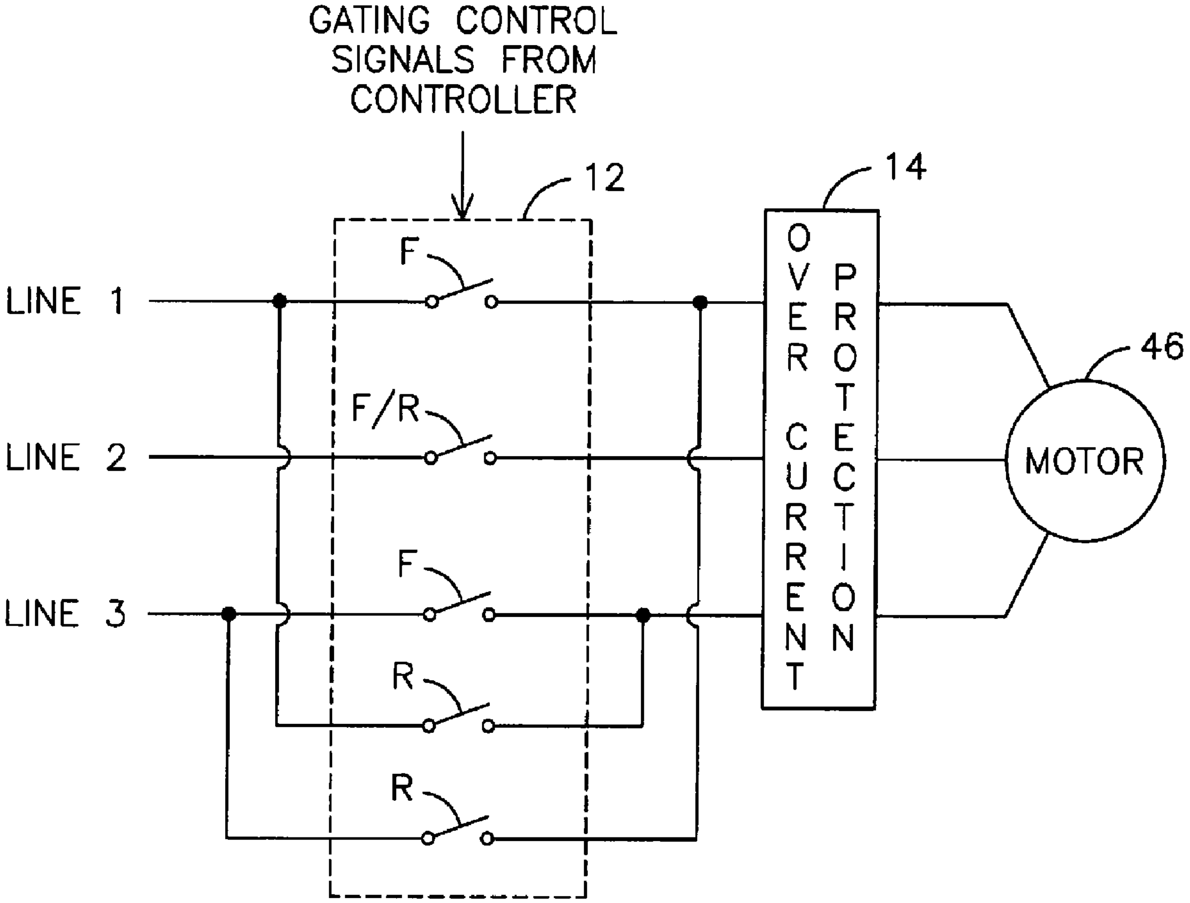

FIG. 17 is one example embodiment of a MEMS-based reversing motor starter.

DETAILED DESCRIPTION

In accordance with one or more embodiments of the present invention, apparatus or systems for micro-electromechanical system based electrical motor starter will be described herein. In the following detailed description, numerous specific details are set forth in order to provide a thorough understanding of various embodiments of the present invention. However, those skilled in the art will understand that embodiments of the present invention may be practiced without these specific details, that the present invention is not limited to the depicted embodiments, and that the present invention may be practiced in a variety of alternative embodiments. In other instances, well known methods, procedures, and components have not been described in detail.

Furthermore, various operations may be described as multiple discrete steps performed in a manner that is helpful for understanding embodiments of the present invention. However, the order of description should not be construed as to imply that these operations need be performed in the order they are presented, nor that they are even order dependent. Moreover, repeated usage of the phrase “in one embodiment” does not necessarily refer to the same embodiment, although it may. Lastly, the terms “comprising”, “including”, “having”, and the like, as used in the present application, are intended to be synonymous unless otherwise indicated.

Figure 1:
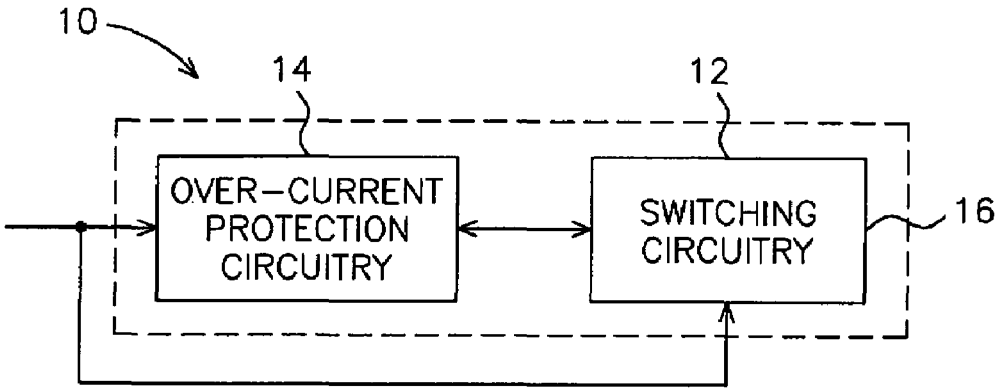
FIG. 1 is a block diagram of an exemplary MEMS based motor starter, in accordance with aspects of the present technique.

FIG. 1 illustrates a block diagram of an exemplary micro-electromechanical system (MEMS)-based motor starter 10, in accordance with aspects of the present invention. Presently, MEMS generally refer to micron-scale structures that for example can integrate a multiplicity of functionally distinct elements, e.g., mechanical elements, electromechanical elements, sensors, actuators, and electronics, on a common substrate through micro-fabrication technology. It is contemplated, however, that many techniques and structures presently available in MEMS devices will in just a few years be available via nanotechnology-based devices, e.g., structures that may be smaller than 100 nanometers in size. Accordingly, even though example embodiments described throughout this document may refer to MEMS-based motor starter, it is submitted that the inventive aspects of the present invention should be broadly construed and should not be limited to micron-sized devices The inventors of the present invention have innovatively recognized an adaptation of MEMS-based switching circuitry useful to realize a practical system level implementation of an improved motor starter conducive to more reliably and cost-effectively solving the switching, overload, and short circuit issues encountered in a conventional motor starter. For example, from a system design conventional motor starters may be generally viewed as a conglomerate of various electrical components pieced together to provide a required starter functionality.

As illustrated in FIG. 1, MEMS based motor starter 10 is shown as including MEMS based switching circuitry 12 and over current protection circuitry 14, where the over current protection circuitry 14 is operatively coupled to the MEMS based switching circuitry 12. In certain embodiments, the MEMS based switching circuitry 12 may be integrated in its entirety with the over current protection circuitry 14 in a single package 16, for example. In other embodiments, only certain portions or components of the MEMS based switching circuitry 12 may be integrated with the over current protection circuitry 14.

In a presently contemplated configuration as will be described in greater detail with reference to FIGS. 2-5, the MEMS based switching circuitry 12 may include one or more MEMS switches. Additionally, the over current protection circuitry 14 may include a balanced diode bridge and a pulse circuit. Further, the over current protection circuitry 14 may be configured to facilitate suppression of an arc formation between contacts of the one or more MEMS switches. It may be noted that the over current protection circuitry 14 may be configured to facilitate suppression of an arc formation in response to an alternating current (AC) or a direct current (DC).

Figure 2:
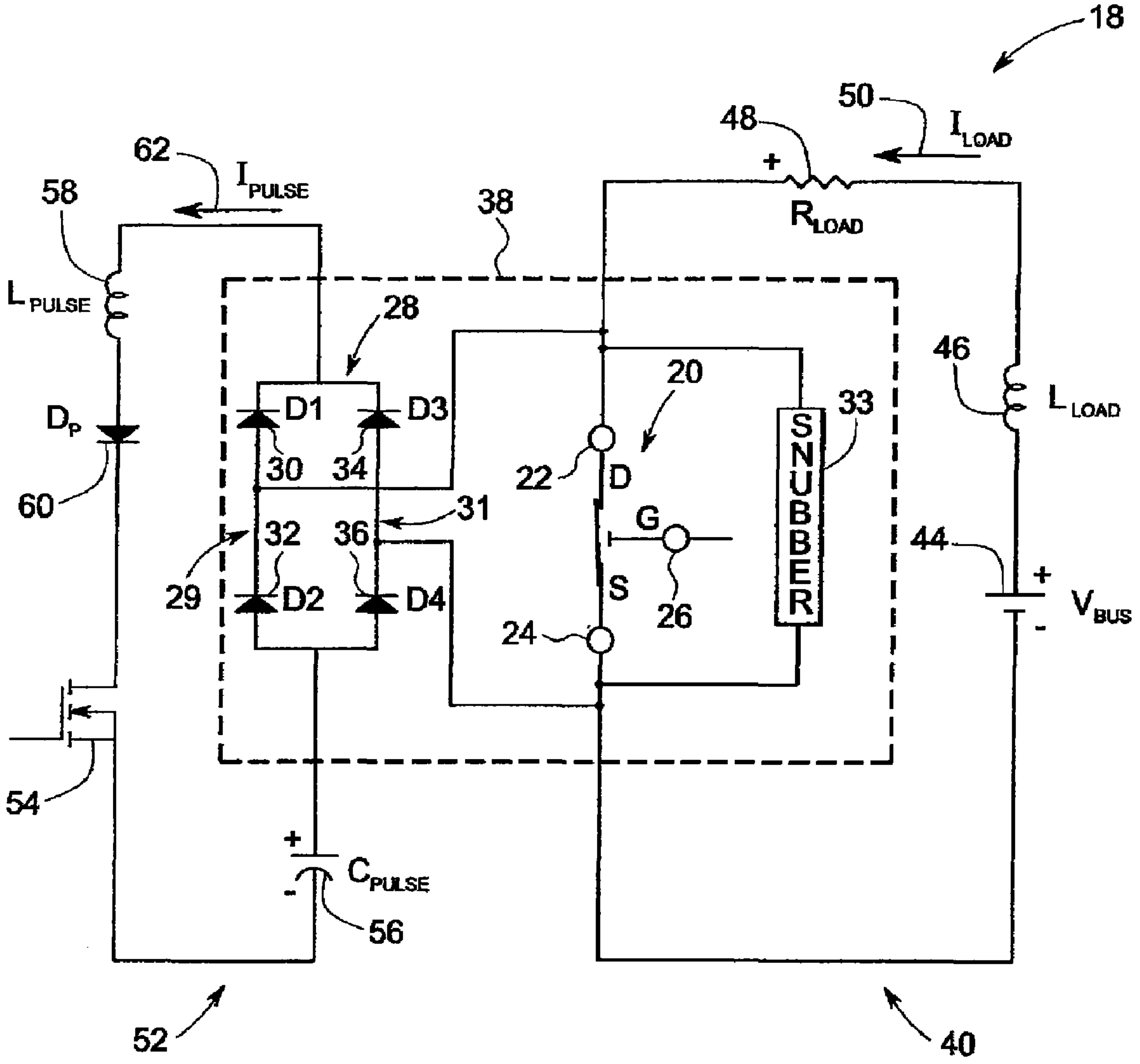
FIG. 2 is schematic diagram illustrating the exemplary MEMS based motor starter depicted in FIG. 1.

Turning now to FIG. 2, a schematic diagram 18 of the exemplary MEMS based motor starter depicted in FIG. 1 is illustrated in accordance with one embodiment. As noted with reference to FIG. 1, the MEMS based switching circuitry 12 may include one or more MEMS switches. In the illustrated embodiment, a first MEMS switch 20 is depicted as having a first contact 22, a second contact 24 and a third contact 26. In one embodiment, the first contact 22 may be configured as a drain, the second contact 24 may be configured as a source and the third contact 26 may be configured as a gate. Furthermore, as illustrated in FIG. 2, a voltage snubber circuit 33 may be coupled in parallel with the MEMS switch 20 and configured to limit voltage overshoot during fast contact separation as will be explained in greater detail hereinafter. In certain embodiments, the snubber circuit 33 may include a snubber capacitor (not shown) coupled in series with a snubber resistor (not shown). The snubber capacitor may facilitate improvement in transient voltage sharing during the sequencing of the opening of the MEMS switch 20. Furthermore, the snubber resistor may suppress any pulse of current generated by the snubber capacitor during closing operation of the MEMS switch 20. In one example embodiment, snubber 33 may comprise one or more types of circuits, e.g., an R/C snubber and/or a solid-state snubber (such as a metal oxide varistor (MOV) or any suitable overvoltage protection circuit, e.g., a rectifier coupled to feed a capacitor.

In accordance with further aspects of the present technique, a load circuit 40, such an electromotive machine or electric motor, may be coupled in series with the first MEMS switch 20. The load circuit 40 may be connected to a suitable voltage source $V_{BUS}$ 44. In addition, the load circuit 40 may comprise a load inductance 46 $L_{LOAD}$, where the load inductance $L_{LOAD}$ 46 is representative of a combined load inductance and a bus inductance viewed by the load circuit 40. The load circuit 40 may also include a load resistance $R_{LOAD}$ 48 representative of a combined load resistance viewed by the load circuit 40. Reference numeral 50 is representative of a load circuit current $I_{LOAD}$ that may flow through the load circuit 40 and the first MEMS switch 20.

Further, as noted with reference to FIG. 1, the over current protection circuitry 14 may include a balanced diode bridge. In the illustrated embodiment, a balanced diode bridge 28 is depicted as having a first branch 29 and a second branch 31. As used herein, the term "balanced diode bridge" is used to represent a diode bridge that is configured such that voltage drops across both the first and second branches 29, 31 are substantially equal. The first branch 29 of the balanced diode bridge 28 may include a first diode D1 30 and a second diode D2 32 coupled together to form a first series circuit. In a similar fashion, the second branch 31 of the balanced diode bridge 28 may include a third diode D3 34 and a fourth diode D4 36 operatively coupled together to form a second series circuit.

In one embodiment, the first MEMS switch 20 may be coupled in parallel across midpoints of the balanced diode bridge 28. The midpoints of the balanced diode bridge may include a first midpoint located between the first and second diodes 30, 32 and a second midpoint located between the third and fourth diodes 34, 36. Furthermore, the first MEMS switch 20 and the balanced diode bridge 28 may be tightly packaged to facilitate minimization of parasitic inductance caused by the balanced diode bridge 28 and in particular, the connections to the MEMS switch 20. It may be noted that, in accordance with exemplary aspects of the present technique, the first MEMS switch 20 and the balanced diode bridge 28 are positioned relative to one another such that the inherent inductance between the first MEMS switch 20 and the balanced diode bridge 28 produces a L*di/dt voltage, where L represents the parasitic inductance. The voltage produced may be less than a few percent of the voltage across the drain 22 and source 24 of the MEMS switch 20 when carrying a transfer of the load current to the diode bridge 28 during the MEMS switch 20 turn-off which will be described in greater detail hereinafter. In one embodiment, the first MEMS switch 20 may be integrated with the balanced diode bridge 28 in a single package 38 or optionally, the same die with the intention of minimizing the inductance interconnecting the MEMS switch 20 and the diode bridge 28.

Additionally, the over current protection circuitry 14 may include a pulse circuit 52 coupled in operative association with the balanced diode bridge 28. The pulse circuit 52 may be configured to detect a switch condition and initiate opening of the MEMS switch 20 responsive to the switch condition. As used herein, the term "switch condition" refers to a condition that triggers changing a present operating state of the MEMS switch 20. For example, the switch condition may result in changing a first closed state of the MEMS switch 20 to a second open state or a first open state of the MEMS switch 20 to a second closed state. A switch condition may occur in response to a number of actions including but not limited to a circuit fault, circuit overload, or switch ON/OFF request.

The pulse circuit 52 may include a pulse switch 54 and a pulse capacitor $C_{PULSE}$ 56 series coupled to the pulse switch 54. Further, the pulse circuit may also include a pulse inductance $L_{PULSE}$ 58 and a first diode $D_P$ 60 coupled in series with the pulse switch 54. The pulse inductance $L_{PULSE}$ 58, the diode $D_P$ 60, the pulse switch 54 and the pulse capacitor $C_{PULSE}$ 56 may be coupled in series to form a first branch of the pulse circuit 52, where the components of the first branch may be configured to facilitate pulse current shaping and timing. Also, reference numeral 62 is representative of a pulse circuit current $I_{PULSE}$ that may flow through the pulse circuit 52.

In accordance with aspects of the present invention as will be described in further detail hereinafter, the MEMS switch 20 may be rapidly switched (e.g., on the order of picoseconds or nanoseconds) from a first closed state to a second open state while carrying no current or a near zero current. This may be achieved through the combined operation of the load circuit 40, and pulse circuit 52 including the balanced diode bridge 28 coupled in parallel across contacts of the MEMS switch 20.

Figure 3:
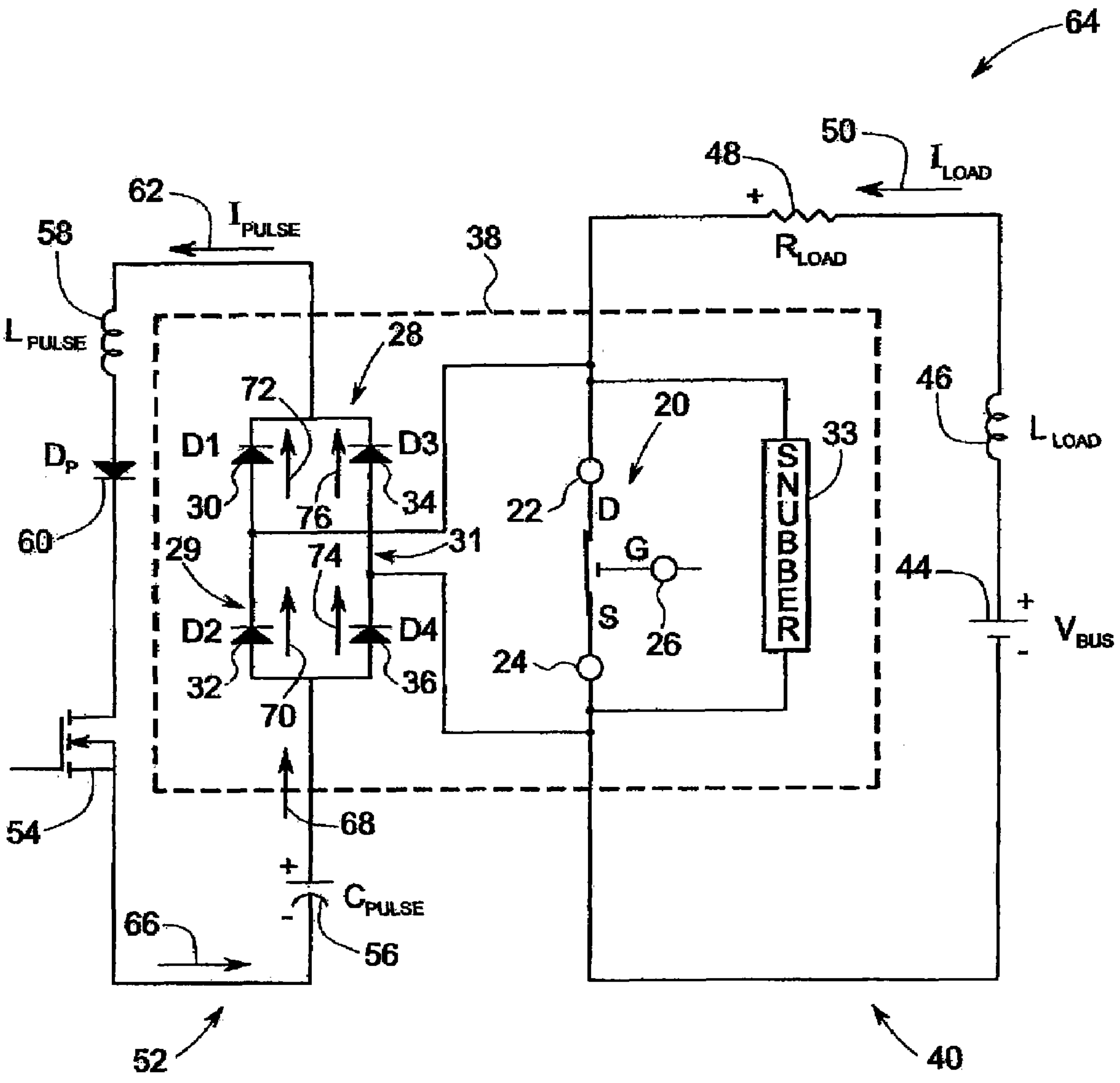
FIGS. 3-5 are schematic flow charts illustrating an example operation of the MEMS based motor starter illustrated in FIG. 2.
Figure 4:
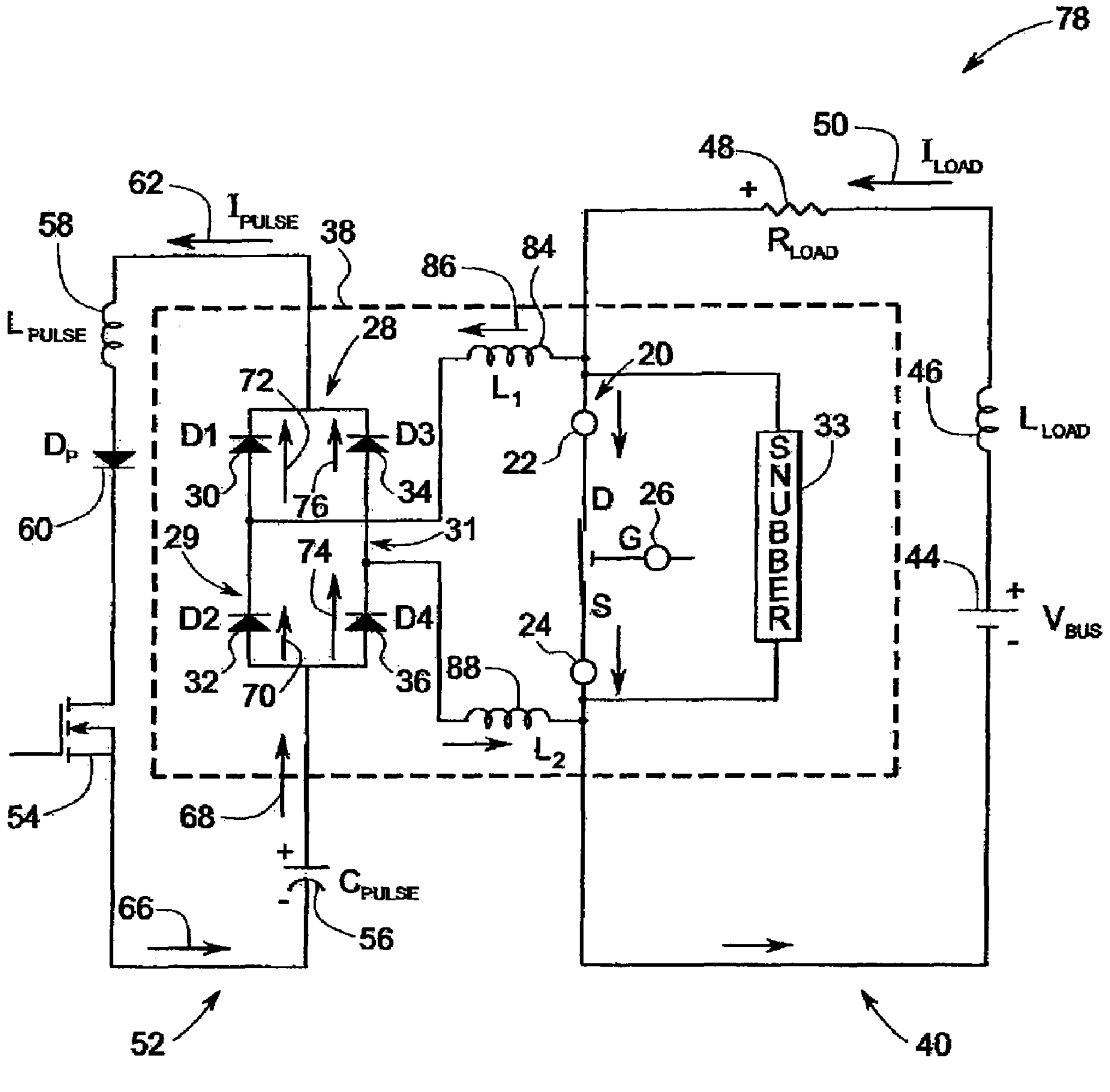
Figure 5:
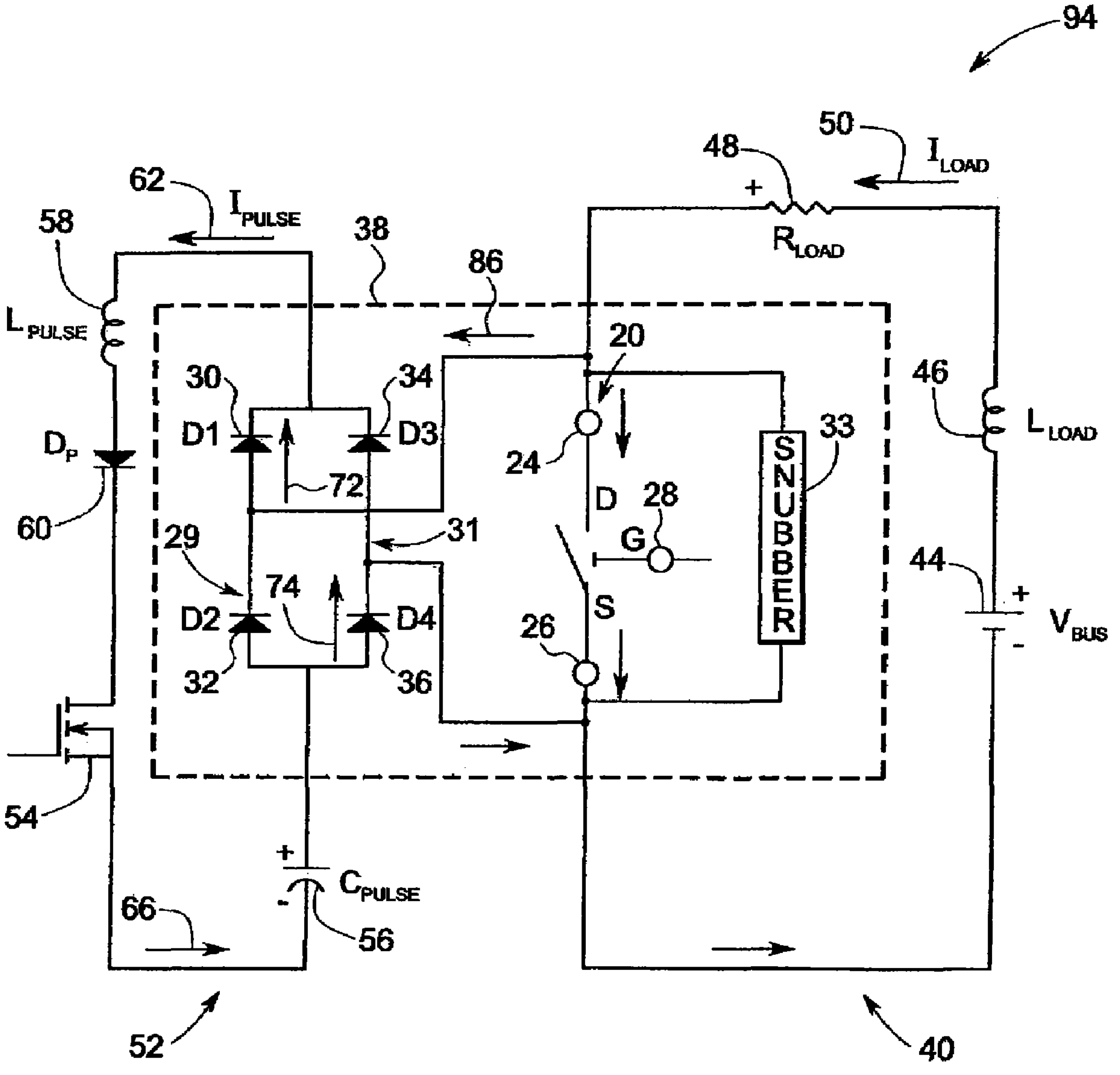

FIGS. 3-5 are used as schematic flow charts to illustrate an example operation of the MEMS based motor starter 18 illustrated in FIG. 2. With continuing reference to FIG. 2, an initial condition of the example operation of the MEMS based motor starter 18 is illustrated. The MEMS switch 20 is depicted as starting in a first closed state. Also, as indicated, there is a load current $I_{LOAD}$ 50 which has a value substantially equal to $V_{BUS}/R_{LOAD}$ in the load circuit 40.

Moreover, for discussion of this example operation of the MEMS based motor starter 18, it may be presumed that a resistance associated with the MEMS switch 20 is sufficiently small such that the voltage produced by the load current through the resistance of MEMS switch 20 has only a negligible effect on the near-zero voltage difference between the mid-points of the diode bridge 28 when pulsed. For example, the resistance associated with the MEMS switch 20 may be presumed to be sufficiently small so as to produce a voltage drop of less than a few millivolts due to the maximum anticipated load current.

It may be noted that in this initial condition of the MEMS based motor starter 18, the pulse switch 54 is in a first open state. Additionally, there is no pulse circuit current in the pulse circuit 52. Also, in the pulse circuit 52, the capacitor $C_{PULSE}$ 56 may be pre-charged to a voltage $V_{PULSE}$, where $V_{PULSE}$ is a voltage that can produce a half sinusoid of pulse current having a peak magnitude significantly greater (e.g., 10×) the anticipated load current $I_{LOAD}$ 50 during the transfer interval of the load current. It may be noted that $C_{PULSE}$ 56 and $L_{PULSE}$ 58 comprise a series resonant circuit.

FIG. 3 illustrates a schematic diagram 64 depicting a process of triggering the pulse circuit 52. It may be noted that detection circuitry (not shown) may be coupled to the pulse circuit 52. The detection circuitry may include sensing circuitry (not shown) configured to sense a level of the load circuit current $I_{LOAD}$ 50 and/or a voltage level of the voltage source $V_{BUS}$ 44 for example. Furthermore, the detection circuitry may be configured to detect a switch condition as described above. In one embodiment, the switch condition may occur due to the current level and/or the voltage level exceeding a predetermined threshold.

The pulse circuit 52 may be configured to detect the switch condition to facilitate switching the present closed state of the MEMS switch 20 to a second open state. In one embodiment, the switch condition may be a fault condition generated due to a voltage level or load current in the load circuit 40 exceeding a predetermined threshold level. However, as will be appreciated, the switch condition may also include monitoring a ramp voltage to achieve a given system-dependent ON time for the MEMS switch 20.

In one embodiment, the pulse switch 54 may generate a sinusoidal pulse responsive to receiving a trigger signal as a result of a detected switching condition. The triggering of the pulse switch 54 may initiate a resonant sinusoidal current in the pulse circuit 52. The current direction of the pulse circuit current may be represented by reference numerals 66 and 68. Furthermore, the current direction and relative magnitude of the pulse circuit current through the first diode 30 and the second diode 32 of the first branch 29 of the balanced diode bridge 28 may be represented by current vectors 72 and 70 respectively. Similarly, current vectors 76 and 74 are representative of a current direction and relative magnitude of the pulse circuit current through the third diode 34 and the fourth diode 36 respectively.

The value of the peak sinusoidal bridge pulse current may be determined by the initial voltage on the pulse capacitor $C_{PULSE}$ 56, value of the pulse capacitor $C_{PULSE}$ 56 and the value of the pulse inductance $L_{PULSE}$ 58. The values for the pulse inductance $L_{PULSE}$ 58 and the pulse capacitor $C_{PULSE}$ 56 also determine the pulse width of the half sinusoid of pulse current. The bridge current pulse width may be adjusted to meet the system load current turn-off requirement predicated upon the rate of change of the load current ($V_{BUS}/L_{LOAD}$) and the desired peak let-through current during a load fault condition. According to aspects of the present invention, the pulse switch 54 may be configured to be in a conducting state prior to opening the MEMS switch 20.

It may be noted that triggering of the pulse switch 54 may include controlling a timing of the pulse circuit current $I_{PULSE}$ 62 through the balanced diode bridge 28 to facilitate creating a lower impedance path as compared to the impedance of a path through the contacts of the MEMS switch 20 during an opening interval. In addition, the pulse switch 54 may be triggered such that a desired voltage drop is presented across the contacts of the MEMS switch 20.

In one embodiment, the pulse switch 54 may be a solid-state switch that may be configured to have switching speeds in the range of nanoseconds to microseconds, for example. The switching speed of the pulse switch 54 should be relatively fast compared to the anticipated rise time of the load current in a fault condition. The current rating required of the MEMS switch 20 may be dependent on the rate of rise of the load current, which in turn is dependent on the inductance $L_{LOAD}$ 46 and the bus supply voltage $V_{BUS}$ 44 in the load circuit 40 as previously noted. The MEMS switch 20 may be appropriately rated to handle a larger load current $I_{LOAD}$ 50 if the load current $I_{LOAD}$ 50 may rise rapidly compared to the speed capability of the bridge pulse circuit.

The pulse circuit current $I_{PULSE}$ 62 increases from a value of zero and divides equally between the first and second branches 29, 31 of the balanced diode bridge 28. In accordance with one embodiment, the difference in voltage drops across the branches 29, 31 of the balanced diode bridge 28 may be designed to be negligible, as previously described. Further, as previously described, the diode bridge 28 is balanced such that the voltage drop across the first and second branches of the diode bridge 28 are substantially equal. Moreover, as the resistance of the MEMS switch 20 in a present closed state is relatively low, there is a relatively small voltage drop across the MEMS switch 20. However, if the voltage drop across the MEMS switch 20 happened to be larger (e.g., due to an inherent design of the MEMS switch), the balancing of the diode bridge 28 may be affected as the diode bridge 28 is operatively coupled in parallel with the MEMS switch 20. In accordance with aspects of the present invention, if the resistance of the MEMS switch 20 causes a significant voltage drop across the MEMS switch 20 then the diode bridge 28 may accommodate the resulting imbalance of the pulse bridge by increasing the magnitude of the peak bridge pulse current.

Referring now to FIG. 4, a schematic diagram 78 is illustrated in which opening of the MEMS switch 20 is initiated. As previously noted, the pulse switch 54 in the pulse circuit 52 is triggered prior to opening the MEMS switch 20. As the pulse current $I_{PULSE}$ 62 increases, the voltage across the pulse capacitor $C_{PULSE}$ 56 decreases due to the resonant action of the pulse circuit 52. In the ON condition in which the switch is closed and conducting, the MEMS switch 20 presents a path of relatively low impedance for the load circuit current $I_{LOAD}$ 50.

Once the amplitude of the pulse circuit current $I_{PULSE}$ 62 becomes greater than the amplitude of the load circuit current $I_{LOAD}$ 50 (e.g., due to the resonant action of the pulse circuit 52), a voltage applied to the gate contact 26 of the MEMS switch 20 may be appropriately biased to switch the present operating state of the MEMS switch 20 from the first closed and conducting state to an increasing resistance condition in which the MEMS switch 20 starts to turn off (e.g., where the contacts are still closed but contact pressure diminishing due the switch opening process) which causes the switch resistance to increase which in turn causes the load current to start to divert from the MEMS switch 20 into the diode bridge 28.

In this present condition, the balanced diode bridge 28 presents a path of relatively low impedance to the load circuit current $I_{LOAD}$ 50 as compared to a path through the MEMS switch 20, which now exhibits an increasing contact resistance. It may be noted that this diversion of load circuit current $I_{LOAD}$ 50 through the MEMS switch 20 is an extremely fast process compared to the rate of change of the load circuit current $I_{LOAD}$ 50. As previously noted, it may be desirable that the values of inductances $L_1$ 84 and $L_2$ 88 associated with connections between the MEMS switch 20 and the balanced diode bridge 28 be very small to avoid inhibition of the fast current diversion.

The process of current transfer from the MEMS switch 20 to the pulse bridge continues to increase the current in the first diode 30 and the fourth diode 36 while simultaneously the current in the second diode 32 and the third diode 34 diminish. The transfer process is completed when the mechanical contacts 22, 24 of the MEMS switch 20 are separated to form a physical gap and all of the load current is carried by the first diode 30 and the fourth diode 36.

Consequent to the load circuit current $I_{LOAD}$ being diverted from the MEMS switch 20 to the diode bridge 28 in direction 86, an imbalance forms across the first and second branches 29, 31 of the diode bridge 28. Furthermore, as the pulse circuit current decays, voltage across the pulse capacitor $C_{PULSE}$ 56 continues to reverse (e.g., acting as a "back electro-motive force") which causes the eventual reduction of the load circuit current $I_{LOAD}$ to zero. The second diode 32 and the third diode 34 in the diode bridge 28 become reverse biased which results in the load circuit now including the pulse inductor $L_{PULSE}$ 58 and the bridge pulse capacitor $C_{PULSE}$ 56 and to become a series resonant circuit.

Turning now to FIG. 5, a schematic diagram 94 for the circuit elements connected for the process of decreasing the load current is illustrated. As alluded to above, at the instant that the contacts of the MEMS switch 20 part, infinite contact resistance is achieved. Furthermore, the diode bridge 28 no longer maintains a near-zero voltage across the contacts of the MEMS switch 20. Also, the load circuit current $I_{LOAD}$ is now equal to the current through the first diode 30 and the fourth diode 36. As previously noted, there is now no current through the second diode 32 and the third diode 34 of the diode bridge 28.

Additionally, a significant switch contact voltage difference from the drain 24 to the source 26 of the MEMS switch 20 may now rise to a maximum of approximately twice the $V_{BUS}$ voltage at a rate determined by the net resonant circuit which includes the pulse inductor $L_{PULSE}$ 58, the pulse capacitor $C_{PULSE}$ 56, the load circuit inductor $L_{LOAD}$ 46, and damping due to the load resistor $R_{LOAD}$ 48 and circuit losses. Moreover, the pulse circuit current $I_{PULSE}$ 62, that at some point was equal to the load circuit current $I_{LOAD}$ 50, may decrease to a zero value due to resonance and such a zero value may be maintained due to the reverse blocking action of the diode bridge 28 and the diode $D_P$ 60. The voltage across the pulse capacitor $C_{PULSE}$ 56 due to resonance would reverse polarity to a negative peak and such a negative peak would be maintained until the pulse capacitor $C_{PULSE}$ 56 is recharged.

The diode bridge 28 may be configured to maintain a near-zero voltage across the contacts of the MEMS switch 20 until the contacts separate to open the MEMS switch 20, thereby preventing damage by suppressing any arc that would tend to form between the contacts of the MEMS switch 20 during opening. Additionally, the contacts of the MEMS switch 20 approach the opened state at a much reduced contact current through the MEMS switch 20. Also, any stored energy in the circuit inductance, the load inductance and the source may be transferred to the pulse circuit capacitor $C_{PULSE}$ 56 and may be absorbed via voltage dissipation circuitry (not shown). The voltage snubber circuit 33 may be configured to limit voltage overshoot during the fast contact separation due to the inductive energy remaining in the interface inductance between the bridge and the MEMS switch. Furthermore, the rate of increase of reapply voltage across the contacts of the MEMS switch 20 during opening may be controlled via use of the snubber circuit (not shown).

It may also be noted that although a gap is created between the contacts of the MEMS switch 20 when in an open state, a leakage current may nonetheless exist between the load circuit 40 and the diode bridge circuit 28 around the MEMS switch 20. (A path could also form through the MOV and/or R/C snubber circuits). This leakage current may be suppressed via introduction of a secondary mechanical switch (not shown) series connected in the load circuit 40 to generate a physical gap. In certain embodiments, the mechanical switch may include a second MEMS switch.

Figure 6:
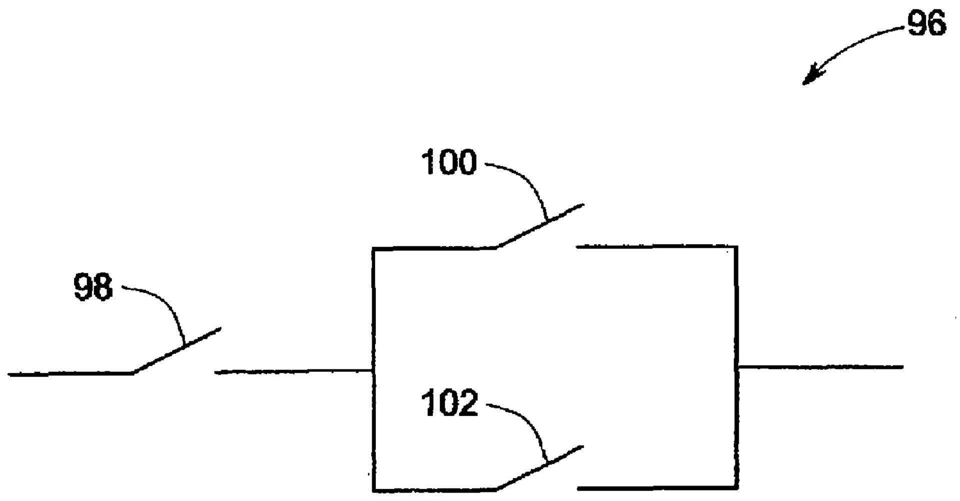
FIG. 6 is schematic diagram illustrating a series-parallel array of MEMS switches.

FIG. 6 illustrates an exemplary embodiment 96 wherein the switching circuitry 12 (see FIG. 1) may include multiple MEMS switches arranged in a series or series-parallel array, for example. Additionally, as illustrated in FIG. 6, the MEMS switch 20 may replaced by a first set of two or more MEMS switches 98, 100 electrically coupled in a series circuit. In one embodiment, at least one of the first set of MEMS switches 98, 100 may be further coupled in a parallel circuit, where the parallel circuit may include a second set of two or more MEMS switches (e.g., reference numerals 100, 102). In accordance with aspects of the present invention, a static grading resistor and a dynamic grading capacitor may be coupled in parallel with at least one of the first or second set of MEMS switches.

Figure 7:
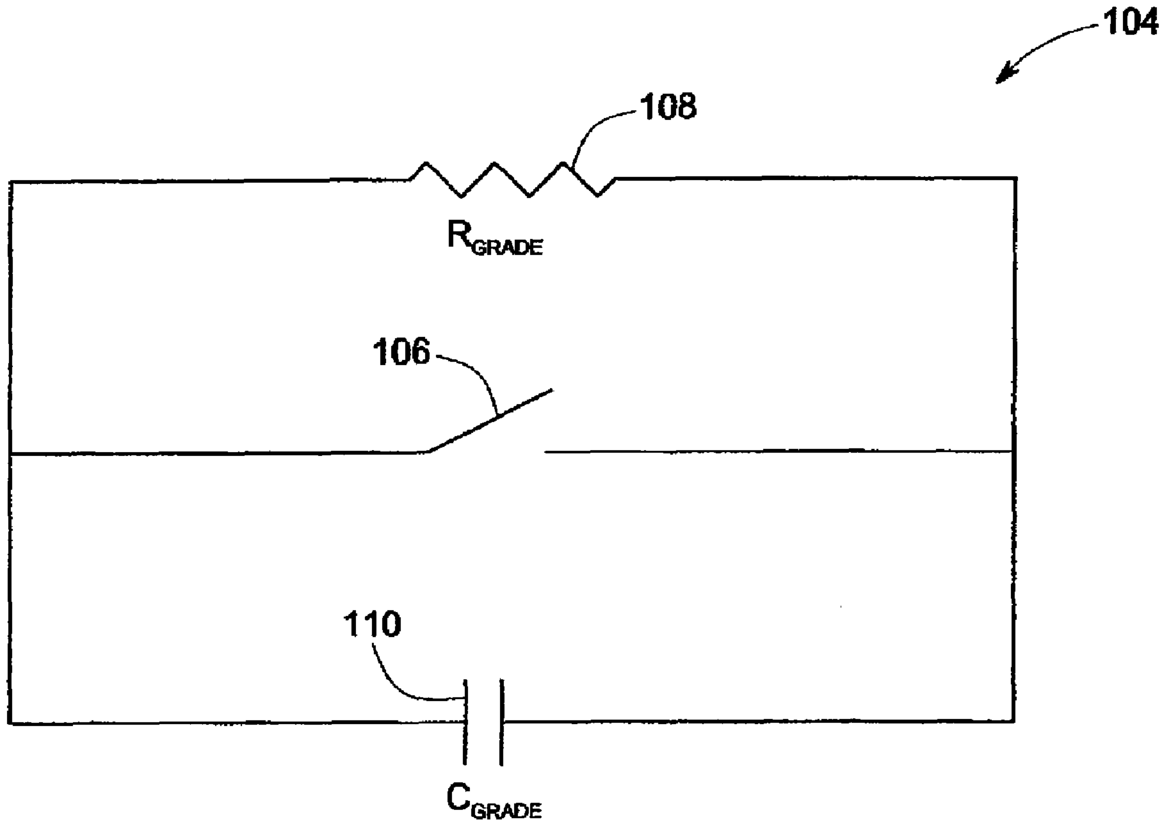
FIG. 7 is schematic diagram illustrating a graded MEMS switch.

Referring now to FIG. 7, an exemplary embodiment 104 of a graded MEMS switch circuit is depicted. The graded switch circuit 104 may include at least one MEMS switch 106, a grading resistor 108, and a grading capacitor 110. The graded switch circuit 104 may include multiple MEMS switches arranged in a series or series-parallel array as for example illustrated in FIG. 6. The grading resistor 108 may be coupled in parallel with at least one MEMS switch 106 to provide voltage grading for the switch array. In an exemplary embodiment, the grading resistor 108 may be sized to provide adequate steady state voltage balancing (division) among the series switches while providing acceptable leakage for the particular application. Furthermore, both the grading capacitor 110 and grading resistor 108 may be provided in parallel with each MEMS switch 106 of the array to provide sharing both dynamically during switching and statically in the OFF state. It may be noted that additional grading resistors or grading capacitors or both may be added to each MEMS switch in the switch array. In certain other embodiments, the grading circuit 104 may include a metal oxide varistor (MOV) (not shown).

Figure 8:
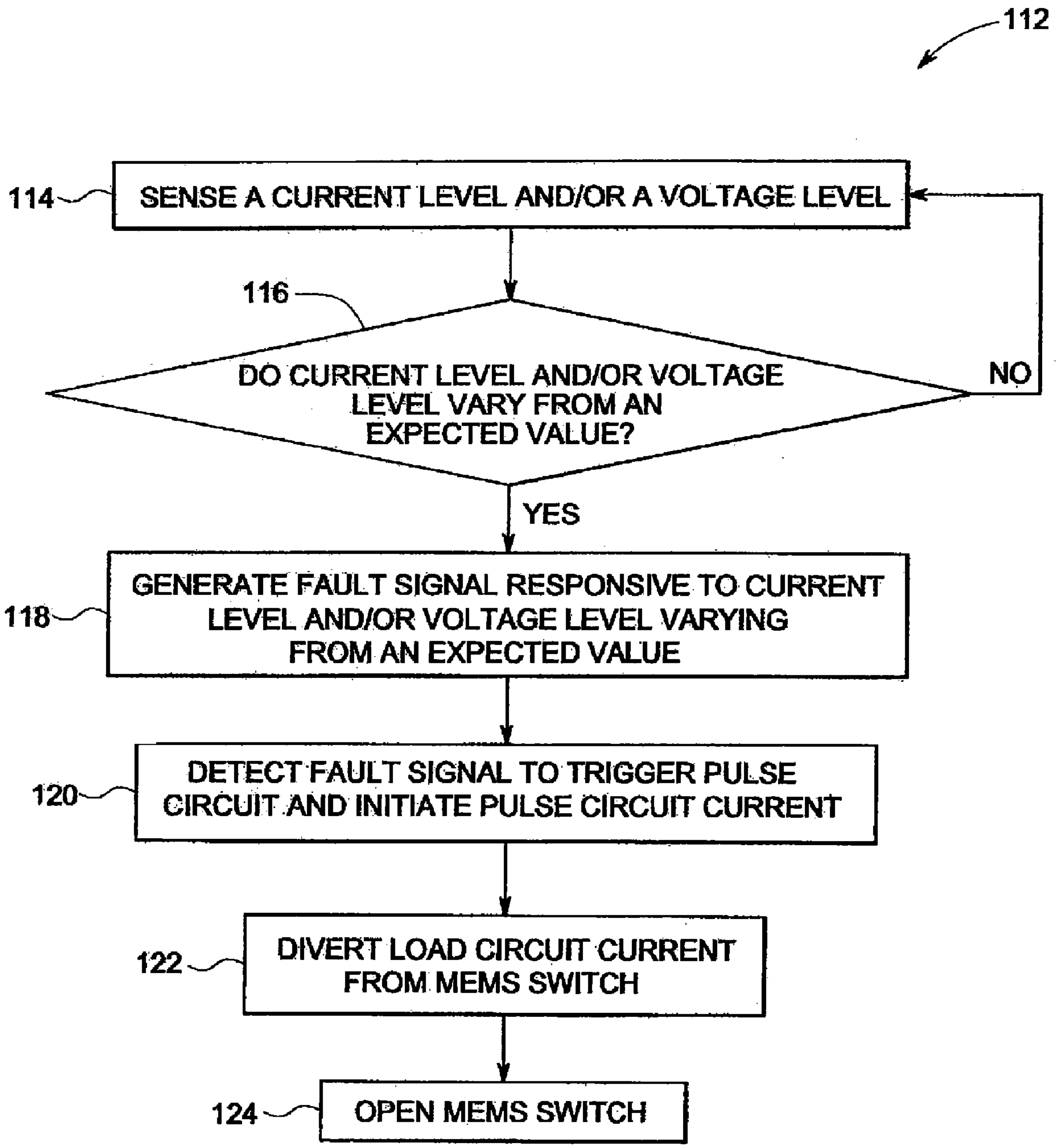
FIG. 8 is a flow diagram depicting an operational flow of a system having the MEMS based motor starter illustrated in FIG. 1.

FIG. 8 is a flow chart of exemplary logic 112 for switching a MEMS based motor starter from a present operating state to a second state. In accordance with exemplary aspects of the present technique, a method for switching is presented. As previously noted, detection circuitry may be operatively coupled to the over current protection circuitry and configured to detect a switch condition. In addition, the detection circuitry may include sensing circuitry configured to sense a current level and/or a voltage level.

As indicated by block 114, a current level in a load circuit, such as the load circuit 40 (see FIG. 2), and/or a voltage level may be sensed, via the sensing circuitry, for example. Additionally, as indicated by decision block 116 a determination may be made as to whether either the sensed current level or the sensed voltage level varies from and exceeds an expected value. In one embodiment, a determination may be made (via the detection circuitry, for example) as to whether the sensed current level or the sensed voltage level exceeds respective predetermined threshold levels. Alternatively, voltage or current ramp rates may be monitored to detect a switch condition without a fault having actually occurred.

If the sensed current level or sensed voltage level varies or departs from an expected value, a switch condition may be generated as indicated by block 118. As previously noted, the term “switch condition” refers to a condition that triggers changing a present operating state of the MEMS switch. In certain embodiments, the switch condition may be generated responsive to a fault signal and may be employed to facilitate initiating opening of the MEMS switch. It may be noted that blocks 114-118 are representative of one example of generating a switch condition. However as will be appreciated, other methods of generating the switch condition are also envisioned in accordance with aspects of the present invention.

As indicated by block 120, the pulse circuit may be triggered to initiate a pulse circuit current responsive to the switch condition. Due to the resonant action of the pulse circuit, the pulse circuit current level may continue to increase. Due at least in part to the diode bridge 28, a near-zero voltage drop may be maintained across the contacts of the MEMS switch if the instantaneous amplitude of the pulse circuit current is significantly greater than the instantaneous amplitude of the load circuit current. Additionally, the load circuit current through the MEMS switch may be diverted from the MEMS switch to the pulse circuit as indicated by block 122. As previously noted, the diode bridge presents a path of relatively low impedance as opposed to a path through the MEMS switch, where a relatively high impedance increases as the contacts of the MEMS switch start to part. The MEMS switch may then be opened in an arc-less manner as indicated by block 124.

As previously described, a near-zero voltage drop across contacts of the MEMS switch may be maintained as long as the instantaneous amplitude of the pulse circuit current is significantly greater than the instantaneous amplitude of the load circuit current, thereby facilitating opening of the MEMS switch and suppressing formation of any arc across the contacts of the MEMS switch. Thus, as described hereinabove, the MEMS switch may be opened at a near-zero voltage condition across the contacts of the MEMS switch and with a greatly reduced current through the MEMS switch.

Figure 9:
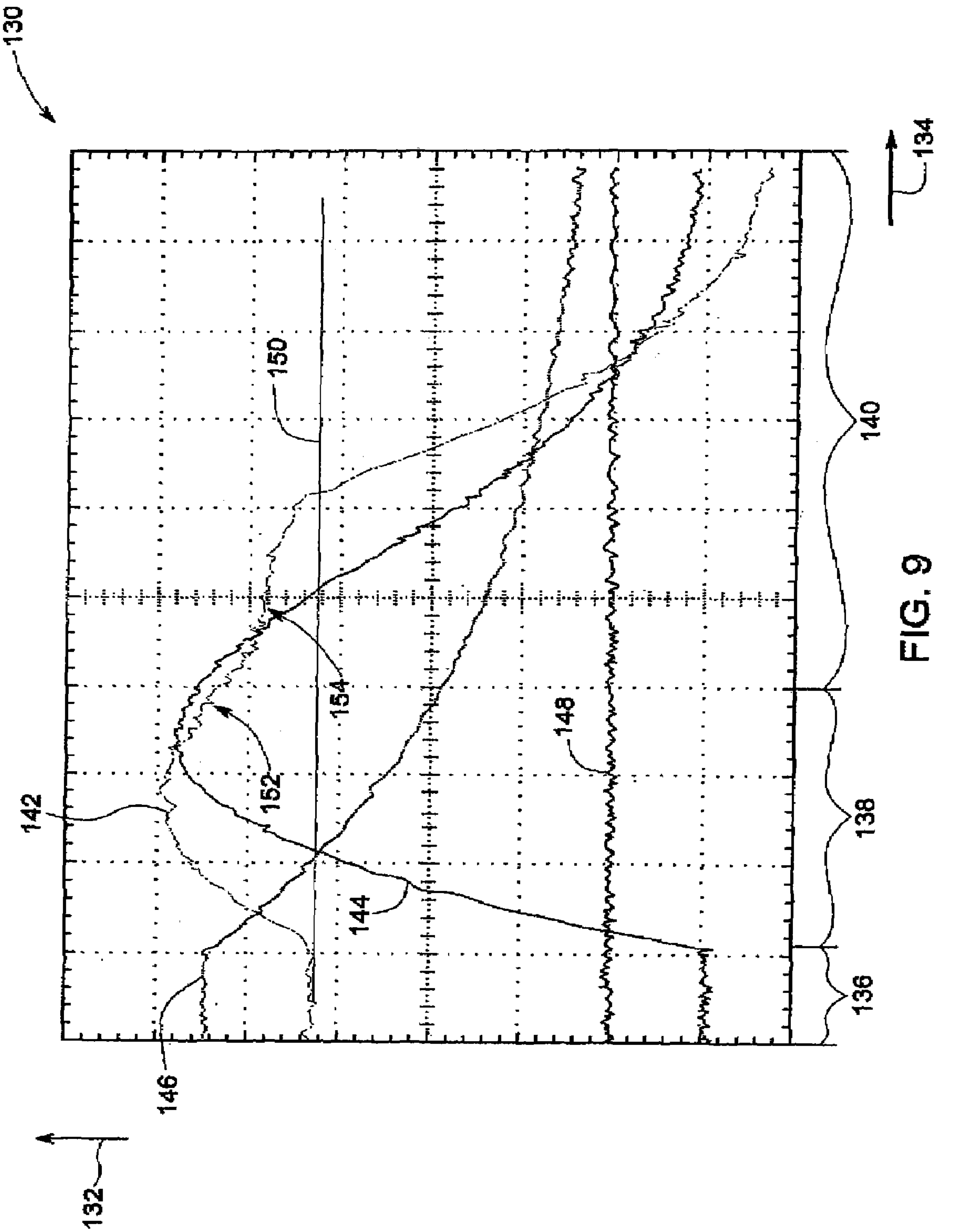
FIG. 9 is a graphical representation of experimental results representative of turn off of the motor starter.

FIG. 9 is a graphical representation 130 of experimental results representative of switching a present operating state of the MEMS switch of the MEMS based motor starter, in accordance with aspects of the present technique. As depicted in FIG. 9, a variation in amplitude 132 is plotted against a variation in time 134. Also, reference numerals 136, 138 and 140 are representative of a first section, a second section, and a third section of the graphical illustration 130.

Response curve 142 represents a variation of amplitude of the load circuit current as a function of time. A variation of amplitude of the pulse circuit current as a function of time is represented in response curve 144. In a similar fashion, a variation of amplitude of gate voltage as a function of time is embodied in response curve 146. Response curve 148 represents a zero gate voltage reference, while response curve 150 is the reference level for the load current prior to turn-off.

Additionally, reference numeral 152 represents region on the response curve 142 where the process of switch opening occurs. Similarly, reference numeral 154 represents a region on the response curve 142 where the contacts of the MEMS switch have parted and the switch is in an open state. Also, as can be seen from the second section 138 of the graphical representation 130, the gate voltage is pulled low to facilitate initiating opening of the MEMS switch. Furthermore, as can be seen from the third section 140 of the graphical representation 130, the load circuit current 142 and the pulse circuit current 144 in the conducting half of the balanced diode bridge are decaying.

Aspects of the present invention comprise circuitry and/or techniques that reliably and cost-effectively enable to withstand a surge current (e.g., during a start up event or a transient condition) with solid state (e.g., semiconductor-based) switching circuitry while able to, for example, utilize MEMS-based switching circuitry for steady state operation and for addressing fault conditions that may arise.

As will be appreciated by one skilled in the art, the surge current may arise when starting up an electrical load, such as a motor or some other type of electrical equipment, or may arise during a transient condition. The value of the surge current during a start up event often comprises multiple times (e.g., six times or more) the value of the steady state load current and can last for several seconds, such as in the order of ten seconds.

FIG. 10 is a block diagram representation of a motor starter 200 embodying aspects of the present invention. In one example embodiment, motor starter 200 connects in a parallel circuit MEMS-based switching circuitry 202, solid-state switching circuitry 204, and an over-current protection circuitry 206, such as may comprise in one example embodiment pulse circuit 52 and balanced diode bridge 31, as shown and/or described in the context of FIGS. 1-9.

A controller 208 may be coupled to MEMS-based switching circuitry 202, solid-state switching circuitry 204, and over-current protection circuitry 206. Controller 208 may be configured to selectively transfer current back and forth between the MEMS-based switching circuitry and the solid state switching circuitry by performing a control strategy configured to determine when to actuate over-current protection circuitry 206, and also when to open and close each respective switching circuitry, such as may be performed in response to load current conditions appropriate to the current-carrying capabilities of a respective one of the switching circuitries and/or during fault conditions that may affect the motor starter. It is noted that in such a control strategy it is desirable to be prepared to perform fault current limiting while transferring current back and forth between the respective switching circuitries 202 and 204, as well as performing current limiting and load de-energization whenever the load current approaches the maximum current handling capacity of either switching circuitry.

A system embodying the foregoing example circuitry may be controlled such that the surge current is not carried by MEMS based switching circuitry 202 and such a current is instead carried by solid-state switching circuitry 204. The steady-state current would be carried by MEMS based switching circuitry 202, and over-current and/or fault protection would be available during system operation through over-current protection circuit 206. It will be appreciated that in its broad aspects the proposed concepts need not be limited to MEMS-based switching circuitry. For example, a system comprising one or more standard electromechanical switches (i.e., not MEMS-based electromechanical switching circuitry) in parallel with one or more solid state switches and a suitable controller may similarly benefit from the advantages afforded by aspects of the present invention.

Below is an example sequence of switching states as well as example current values in the motor starter upon occurrence of a motor starting event. The letter X next to a number indicates an example current value corresponding to a number of times the value of a typical current under steady state conditions. Thus, 6× denotes a current value corresponding to six times the value of a typical current under steady state conditions.

1. Solid state switching circuitry—Open MEMS based switching circuitry—Open Current 0
2. Solid state switching circuitry—Closed MEMS based switching circuitry—Open Current—6×
3. Solid state switching circuitry—Closed MEMS based switching circuitry—Closed Current—1×
4. Solid state switching circuitry—Open MEMS based switching circuitry—Closed Current—1×

FIG. 11 illustrates one example embodiment where the solid state switching circuitry 204 in motor starter 200 comprises two FET (Field Effect Transistor) switches 210 and 212 (connected in an inverse-parallel configuration with diodes 214 and 216 for enabling conduction of AC current) connected in a parallel circuit with over-protection circuitry 206 and MEMS based switching circuitry 202. The electrical load (not shown) may be activated by turning on the FET switches 210 and 212 which allows start-up current (designated as "Istart") to begin flowing to the load, and in turn allows FET switches 210 and 212 to carry this current during the start-up of the load. It will be appreciated that solid state switching circuitry 204 is neither limited to the circuit arrangement shown in FIG. 11 nor is it limited to FET switches. For instance, any solid state or semiconductor power switching device that provides bidirectional current conduction capability may work equally effective for a given AC application. One skilled in the art will appreciate that the bidirectional capability may be inherent in the switching device, such as in a TRIAC, RCT, or may be achieved through an appropriate arrangement of at least two such devices, such as IGBTs, FETs, SCRs, MOSFETs, etc.

FIG. 16 illustrates an example embodiment wherein solid state switching circuitry 204 comprises a pair of MOSFET switches 240 and 242 connected in an inverse series circuit arrangement. Note that diodes 244 and 246 comprise body diodes. That is, such diodes comprise integral parts of their respective MOSFET switches. With zero gate drive voltage, each switch is turned off; hence the switches will each block opposite polarities of an alternating voltage while each corresponding diode of the other switch is forward-biased. Upon application of a suitable gate drive voltage from a gate drive circuit 222, each MOSFET will revert to a low resistance state, regardless of the polarity of AC voltage present at the switching terminals.

As will be appreciated by one skilled in the art, the voltage drop across an inverse-series connected pair of MOSFETs is the IR drop of two Rdson (on-resistance) switches, in lieu of one Rdson plus the voltage drop of a diode, as would be the case in an inverse-parallel arrangement. Thus, in one example embodiment an inverse-series configuration of MOSFETs may be desirable since it has the capability of providing a relatively lower voltage drop, hence lower power dissipation, heat, and energy loss.

It will be further appreciated that in one example embodiment wherein solid state switching circuitry 204 comprises a bidirectional thyristor (or an inverse-parallel pair of thyristors), while this arrangement may incur relatively higher losses at lower currents, such an arrangement would have the advantage of being able to withstand a relatively higher short-term current surge because of the relatively lower voltage drop at high currents, and the transient thermal response characteristics.

It is contemplated that in one example embodiment solid state switching circuitry 204 may be used to perform soft-starting (or stopping) of the motor by controlling current pulses. By switching the solid state circuitry in correspondence with a variable phase angle of an alternating source voltage or alternating load current, one can adjust the electrical energy resulting from a stream of current pulses applied to the motor. For example, when the motor is first energized, solid state switching circuitry 204 can be turned on close to voltage zero as the voltage is approaching zero. This will produce only a small pulse of current. The current will rise, reach a peak at approximately the time the voltage reaches zero, and then will fall to zero as the voltage reverses. The firing (phase) angle is gradually advanced to produce larger current pulses, until the current reaches a desired value, such as three times rated load. Eventually, as the motor starts up and the current amplitude continues to decay, the firing angle is further advanced until eventually full line voltage is continuously applied to the motor. For readers desirous of general background information regarding an example soft starting technique with solid state switching circuitry, reference is made to U.S. Pat. No. 5,341,080, titled "Apparatus and Three Phase Induction Motor Starting and Stopping Control Method", assigned in common to the same assignee of the present invention and herein incorporated by reference.

After the initial start-up current has subsided to a suitable level, MEMS-based switching circuitry 202 may be turned on using a suitable MEMS-compatible switching technique, or by closing into the voltage that is dropped across the solid-state switching circuitry provided such voltage drop comprises a relatively small voltage. At this point, FET switches 210 and 219 can be turned off. FIG. 12 illustrates a condition of motor starter 200 wherein the steady-state current (designated as "Iss") is carried by MEMS based switching circuitry 202.

As will be appreciated by one skilled in the art, MEMS-based switching circuitry should not be closed to a conductive switching state in the presence of a voltage across its switching contacts nor should such circuitry be opened into a non-conductive switching state while passing current through such contacts. One example of a MEMS-compatible switching technique may be a pulse-forming technique as described and/or illustrated in the context of FIGS. 1-9.

Another example of a MEMS-compatible switching technique may be achieved by configuring the motor starter to perform soft or point-on-wave switching whereby one or more MEMS switches in the switching circuitry 202 may be closed at a time when the voltage across the switching circuitry 202 is at or very close to zero, and opened at a time when the current through the switching circuitry 202 is at or close to zero. For readers desirous of background information regarding such a technique reference is made to patent application titled "Micro-Electromechanical System Based Soft Switching", U.S. patent application Ser. No. 11/314,879 filed Dec. 20, 2005, which application is incorporated herein by reference in its entirety.

By closing the switches at a time when the voltage across the switching circuitry 202 is at or very close to zero, pre-strike arcing can be avoided by keeping the electric field low between the contacts of the one or more MEMS switches as they close, even if multiple switches do not all close at the same time. As alluded to above, control circuitry may be configured to synchronize the opening and closing of the one or more MEMS switches of the switching circuitry 202 with the occurrence of a zero crossing of an alternating source voltage or an alternating load circuit current. Should a fault occur during a start up event, over-current protection circuitry 206 is configured to protect the down stream load as well as the respective switching circuitries. As illustrated in FIG. 13, this protection is achieved by transferring the fault current (Ifault) to the over-current protection circuitry 206.

It is noted that although electro-mechanical and solid-state switching circuitry when viewed at a top level may in concept appear to behave substantially similar to one another, in practice, however, such switching circuitry may exhibit respective distinct operational characteristics since they operate based on substantially different physical principles and thus the over-current protection circuitry may have to be appropriately configured to account for such characteristics and still appropriately actuate the switching circuitry. For instance, a MEMS switch generally involves a mechanical movement of a cantilever beam to break contact, whereas a field-effect solid-state switch generally involves movement of charge carriers in a voltage-induced channel, and a bi-polar solid state switch involves injection of charge carriers in a reverse-biased junction. The time it takes to clear the carriers is called the recovery time, and this recovery time can range from a time of <1 μs to a time >100 μs. For instance, if the solid-state switch is closed into a fault, then over-current protection circuitry 206 should be able to absorb the fault current and protect the solid-state switch and the down stream load until the switch's channel is fully cleared and the switch is fully open. In the event over-current protection circuitry 206 comprises a pulse circuit 52 and a balanced diode bridge 31, it can be shown that the pulse characteristics (such as the width and/or height of a pulse formed by the pulse circuit) could affect the quality of down stream protection. For example, over-current protection circuitry 206 should be able to generate a pulse having sufficient width and/or height to accommodate the recovery time of the parallel solid-state switching circuitry as well as accommodate the fault protection for the MEMS based switching circuitry.

As will be appreciated by those skilled in the art, there are two general categories of solid state switching circuitry, with regard to fault current interruption. Some solid state switches (such as FETs) can inherently force a zero current condition when turned off. Others (such as SCRs) cannot force such a zero current condition. Solid state switching circuitry that can force a zero current condition may not need the aid of over-current protection circuitry 206 to perform current limiting during a fault. Solid state switching circuitry that cannot force a zero current condition will generally require an over-current protection circuitry 206.

As previously mentioned, a suitable control technique should be implemented to selectively transfer current back and forth between the MEMS-based switching circuitry and the solid state switching circuitry. In one example embodiment, such a control technique may be based on a respective electrical loss model for each switching circuitry. For instance, electrical losses (and concomitant temperature rise) in MEMS-based switching circuitry are generally proportional to the square of the load current, while losses (and concomitant temperature rise) in solid state switching circuitry are generally proportional to the absolute value of load current. Also, the thermal capacity of solid state devices is generally greater than that of MEMS-based switching circuitry. Accordingly, for normal values of load current, it is contemplated that the MEMS-based switching circuitry will carry the current, while, for temporary overload currents, it is contemplated for the solid state switching circuitry to carry the current. Thus, it is contemplated to transfer current back and forth during transient overload situations.

We will discuss below, three example techniques for selectively transferring load current back and forth between the MEMS-based switching circuitry and the solid state switching circuitry. One example technique contemplates use of dual over-current protection circuitry, such as shown in FIG. 14 where a first over-current protection circuitry $\mathbf{206}_1$ and a second over-current protection circuitry $\mathbf{206}_2$ are connected in parallel circuit with the MEMS-based switching circuitry and the solid state switching circuitry to assist the transfer (this second over-current protection circuitry may also comprise in one example embodiment a pulse circuit 52 and a balanced diode bridge 31, as shown and/or described in the context of FIGS. 1-9).

It is noted that if the motor starter uses just a single over-current protection circuitry 206, then such a single over-current protection circuitry would be activated upon a switching event in connection with the MEMS-based switching circuitry. However, if shortly thereafter a fault were to occur, then the single over-current protection circuitry 206 may not be ready to be reactivated to protect the switching circuitry. As described above, over-current protection circuitry 206 operates based on pulsing techniques, and thus such circuitry would not be instantaneously ready to operate shortly upon a pulse firing. For example, one would have to wait some period of time to recharge the pulse capacitor in pulse circuit 52.

The technique involving redundant over-current protection circuitry ensures leaving one over-current protection circuitry (e.g., circuitry $\mathbf{206}_2$) free and ready to assist current limiting in the event of a fault, even when the other over-current protection circuitry $\mathbf{206}_1$ has just performed a pulse-assisted switching in connection with a normal switching event (non-fault driven switching event). This technique is believed to provide substantial design flexibility with a relatively simpler control, but requires dual over-current protection circuitry instead of a single over-current protection circuitry. It is noted that this technique is compatible with any type of solid state switching circuitry.

It will be appreciated that in an example embodiment that comprises redundant over-current protection circuitry, then such circuitry should include dual pulse circuits 52 but need not include dual balanced diode bridges 31. For example, if the first over-current protection circuitry comprises a respective pulse circuit 52 and a respective balanced diode bridge 31, then the second over-current protection circuitry may just comprise a respective pulse circuit 52 configured to apply a suitable pulse current (when needed) to the balanced diode bridge 31 of the first over protection circuit. Conversely, if the second over-current protection circuitry comprises a respective pulse circuit 52 and a respective balanced diode bridge 31, then the first over-current protection circuitry may just comprise a respective pulse circuit 52 configured to apply a suitable pulse current (when needed) to the balanced diode bridge 31 of the second over protection circuit.

A second example technique is to time the execution of the transfer to coincide with a current zero. This eliminates the need for a second over-current protection circuitry, and is also compatible with any type of solid state switching circuitry. However, this technique may involve relatively more elaborate control and could require a complete shut-off of the system in some cases. A third example technique is to perform the current transfer by coordinating the opening and closing of the MEMS switching circuitry and the solid state switching circuitry. As will be appreciated by one skilled in the art, this technique can be used provided the solid state switching circuitry has a relatively small voltage drop.

In any case, it should be appreciated that the control strategy may be configured to determine when to operate the over-current protection circuitry (either single or dual over-current protection circuitry) and to determine when to open and close the respective switching circuitries, such as in response to load current conditions appropriate to the current-carrying capabilities of a respective one of the switching circuitries. The general concept is to be prepared to perform fault current limiting while transferring current back and forth between alternate current paths, as well as performing current limiting and circuit de-energization when the load current approaches the maximum capacity of either load current carrying path. One example control strategy may be as follows:

Use the solid state switching circuitry to energize the load, on the expectation that there will be a large initial current. Transfer the load over to the MEMS-based switching circuitry after the current falls within the rating of the MEMS-based switching circuitry.

When it is desired to de-energize the load under normal conditions, do so with whatever switching circuitry is carrying the current at that time. If it is the MEMS-based switching circuitry, use point-on-wave switching to turn off at current zero.

Based on simulated or sensed temperatures, determined the respective temperature of both the MEMS-based switching circuitry and the solid state switching circuitry. If any of such temperature is determined to be approaching a respective thermal ratings limit, or if the load current is approaching a respective maximum current carrying capability, (such as under fault conditions or a severe overload) perform an instantaneous current interruption (assisted with the overcurrent protection circuitry) and open both the MEMS-based switching circuitry and the solid state switching circuitry. This action would pre-empt any other control action. Wait for a reset before allowing a re-close switching action.

Under normal operation, the respective thermal conditions of each respective switching circuitry may be used to determine whether to pass current through the MEMS-based switching circuitry or through the solid state switching circuitry. If one switching circuitry is approaching its thermal or current limit while the other switching circuitry still has thermal margin, a transfer may be automatically made. The precise timing would depend on the switching transfer technique. For instance, in a pulse-assisted transfer, the transfer can take place essentially instantaneously as soon as the transfer is needed. In a transfer based on point-on-wave switching, such a transfer would be performed (e.g., deferred) until a next available zero crossing of the current occurs. For a deferred transfer, there should be some margin provided in the setting for the decision to transfer in order to make it likely that the transfer can be successfully deferred until the next current zero.

FIG. 15 illustrates circuitry details for one example embodiment of a motor starter. For example, FIG. 15 illustrates respective drivers 220, 222, 224 and 228 responsive to control signals from controller 208 for respectively driving MEMS-based switching circuitry 206, solid state switching circuitry 204, a first pulse switch 54 and a second pulse switch 229. In one example embodiment, first pulse switch 54 is coupled to respective pulse capacitor 56 and pulse inductor 58 and may be configured to apply a pulse to bridge diode 28 in connection with a turn-on event of MEMS-based switching circuitry, as described in the context of FIGS. 1-9. That is, to form a pulse at a time appropriately chosen to ensure that the voltage across the terminals of MEMS-based switching circuitry is equal to zero (or substantially close to zero) when the MEMS-based switching circuitry is to close. Essentially, the pulse signal is generated in connection with a turn-on of the micro-electromechanical system switching circuitry to a conductive state.

In this example embodiment, second pulse switch 229 is coupled to respective pulse inductor 230 and pulse capacitor 234 and may be configured to apply a pulse to bridge diode 28 in connection with a turn-off event of MEMS-based switching circuitry. That is, to form a pulse at a time appropriately chosen to ensure that the current through the MEMS-based switching circuitry is equal to zero (or substantially close to zero) when the MEMS-based switching circuitry is to open. Essentially, the pulse signal is generated in connection with a turn-off of the micro-electromechanical system switching circuitry to a non-conductive state. This may be accomplished in combination with the alluded point-on-wave (POW) technique, thereby providing an incremental level of robustness to the motor starter design. For example, it is envisioned that this pulse-assisted turn-on technique may allow a motor starter embodying aspects of the present invention to be deployed in applications where the quality of the supply voltage may not be suitable for consistently reliable operation with POW switching alone. It is noted that a third pulse circuit would ensure providing one pulse circuit free and ready to assist current limiting in the event of a fault, i.e., even when both the first and second pulse circuits have just performed a pulse-assisted switching in connection with a normal switching event (non-fault driven switching event). This is an extension of the redundant over-current protection concepts discussed in connection with FIG. 14.

FIG. 15 further illustrates a current sensor 226 connected to controller 208 to sense current as may be used to determine load current conditions appropriate to the current-carrying capabilities of a respective one of the switching circuitries as well as fault conditions that may affect the motor starter.

In operation, a motor starter embodying aspects of the present invention may be utilized in a three-phase, non-reversing, AC motor application. It will be understood, however, that a motor starter embodying aspects of the present invention may be readily adapted for any number of electrical phases, AC or DC voltage, and reversing or non-reversing applications. As will be appreciated by those skilled in the art, in some applications a reversing of the direction of motor shaft rotation may be needed. For example, in a three phase induction motor, a MEMS-based motor starter embodying aspects of the present invention may be adapted to provide switching and control circuitry to provide a reversing motor operation, such as by reconnecting any two of the three line connections to the motor.

FIG. 17 is one example embodiment of a MEMS-based reversing motor starter. For example, the various advantageous operational features provided by over-current protection circuitry 14 would be as described above. In one example embodiment for a three-phase motor, one would inter-connect two additional MEMS switches in MEMS switching circuitry 12 that would be responsive to respective gating control signals from a suitably configured controller to swap two of the three electrical phases. For example, by turning on the switches labeled with a letter 'F', one could operate the motor in the forward direction, and by turning on the switches labeled with the letter 'R' one could operate the motor in the reverse direction. It is noted that a conventional starter would generally require at least ten contactors to provide motor reversing functionality, whereas a MEMS-based starter would just require five MEMS switches to provide the same reversing functionality. The additional elements are needed in a conventional starter to check and ensure an appropriate mechanical and/or electrical interlocking, e.g., to ensure the reverse contactors are not on at the same time as the forward contactors. In a MEMS reversing motor starter, such checks may be advantageously performed by way of an appropriately configured software control module, as may be stored in the controller.

Example motor starter input signals may include: three-phase line input power, electrical ground, and control signals, such as an on-off activation signal, and/or an optional manual on-off activation. The input power can be at any suitable voltage or frequency and the control signals can be either analog or digital signals. A user interface may provide connections (e.g., by way of a terminal block) for the input power lines. A service disconnect (e.g., knife switch) may provide lock-out (tag-out) service disconnection. A control interface (e.g., push-button type) may provide a manual on/off control to a user. Once line power is connected, power circuitry may be configured to provide control power as may be needed by various devices, such as logic circuits, MEMs switch gate drivers, solid state switch gate drivers, pulse circuits, etc.

One example embodiment may use the respective phase-to-phase potentials as the control power source as is customary in a poly-phase system. For a single-phase system the potential may be supplied from a separate source or may be obtained from the phase-to-ground potential. In addition to providing the circuit power, power circuitry may include a line transient suppressor. Once control power is established, control circuitry can function to provide appropriate controls, and the current/voltage sensing. For example, a suitable controller (e.g., a programmable logic controller (PLC) or micro-controller depending on level of functionality) may be configured to execute decision-making algorithms and collect input commands along with sensor information and make the logic decisions regarding the opening/closing of the MEMS-based switching circuitry and/or the solid state switching circuitry.

In one example embodiment, inter-module controls can relay the primary input commands, e.g., providing galvanically isolated control signals for an array of voltage-scalable MEMS switching circuitry modules.

With a voltage grading network and over-current protection circuitry in parallel with MEMS-based switching circuitry, there may be some leakage current in an off state. Accordingly, for applications requiring zero leakage in a tripped state, an isolation contactor may be added. It will be appreciated that such isolation contactor need not be designed to interrupt a large level of load current and thus may just be designed to carry rated current and withstand the applicable dielectric voltages, greatly reducing its size.

It will be apparent by those skilled in the art that circuitry embodying aspects of the present invention, as disclosed in the foregoing description, is able to realize in a reliable and cost effective manner each element and/or operational functionality that may be required from a circuit breaker: For example, the inverse time relationship useful for characterizing circuit breakers, e.g.,—overcurrent curves defined by (I^2*t=K, wherein the allowable duration of an overload is such that the product of time (t) and the square of the current (I) is a constant K)—may be customarily divided into three segments based on current magnitude: For example, long-time (e.g., larger K), short-time (e.g., smaller K), and instantaneous. It is noted that both the long-time and short-time segments generally involve times much longer than a half cycle, hence are amenable to point-on-wave switching. It is also noted, however, that the instantaneous segment will generally require substantially fast sub-half-cycle switching, as may be provided by MEMS-based switching circuitry, since this could be the result of a short circuit that could reach a potential current of kilo-amperes in less than a millisecond with explosive results. Accordingly, in operation, circuitry embodying aspects of the present invention, innovatively meets each element and/or operational functionality, as may be required in a circuit breaker to meet its operational requirements over each of the foregoing operational segments, for example.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A motor starter comprising:

micro-electromechanical system switching circuitry; and at least a first over-current protection circuitry connected in a parallel circuit with the micro-electromechanical system switching circuitry, the first over-current protection circuitry configured to momentarily form an electrically conductive path in response to a first switching event of the micro-electromechanical system switching circuitry, said electrically conductive path in a parallel circuit with the micro-electromechanical system switching circuitry for suppressing arc formation between contacts of the micro-electromechanical system switching circuitry during the first switching event.

2. The motor starter of claim 1 wherein the electrically conductive path is formed by way of a balanced diode bridge.

3. The motor starter of claim 2 further comprising a first pulse circuit coupled to the balanced diode bridge, the pulse circuit comprising a pulse capacitor adapted to form a pulse signal for causing flow of a pulse current through the balanced diode bridge, the pulse signal being generated in connection with a turn-on of the micro-electromechanical system switching circuitry to a conductive state, said turn-on constituting the first switching event.

4. The motor starter of claim 1 further comprising a second over-current protection circuitry connected in a parallel circuit with the micro-electromechanical system switching circuitry and the first over-current protection circuitry, the second over protection circuitry configured to momentarily form an electrically conductive path in response to a second switching event of the micro-electromechanical system switching circuitry, said electrically conductive path in a parallel circuit with the micro-electromechanical system switching circuitry for suppressing arc formation between contacts of the micro-electromechanical system switching circuitry during the second switching event.

5. The motor starter of claim 4 further comprising a second pulse circuit coupled to the balanced diode bridge, the pulse circuit comprising a pulse capacitor adapted to form a pulse signal for causing flow of a pulse current through the balanced diode bridge, the pulse signal being generated in connection with a turn-off of the micro-electromechanical system switching circuitry to a non-conductive state, said turn-off constituting the second switching event.

6. The motor starter of claim 1 further comprising solid state switching circuitry coupled in a parallel circuit with the micro-electromechanical switching circuitry and the first over-current protection circuitry.

7. The motor starter of claim 6 further comprising a controller coupled to the electromechanical switching circuitry and the solid state switching circuitry, the controller configured to perform selective switching of a load current from a motor connected to the motor starter, the selective switching performed between the electromechanical switching circuitry and the solid state switching circuitry in response to a load current condition appropriate to an operational capability of a respective one of the switching circuitries.

8. The motor starter of claim 7 wherein the controller is configured to perform arc-less switching of the micro-electromechanical system switching circuitry responsive to a detected zero crossing of an alternating source voltage or alternating load current.

9. The motor starter of claim 7 wherein the controller is configured to perform a soft motor start by switching the solid state switching circuitry in correspondence with a variable phase angle in an alternating source voltage or alternating load current, thereby adjusting an amount of electrical energy resulting from a stream of current pulses for starting the motor.

10. The motor starter of claim 1 wherein the micro-electromechanical system switching circuitry comprises respective micro-electromechanical system switches arranged to perform a motor reversing operation.

11. A motor starter, comprising:

micro-electromechanical system switching circuitry;

solid state switching circuitry coupled in a parallel circuit with the electromechanical system switching circuitry; and a controller coupled to the electromechanical switching circuitry and the solid state switching circuitry, the controller configured to perform selective switching of a load current from a motor connected to the motor starter, the selective switching performed between the electromechanical switching circuitry and the solid state switching circuitry in response to a motor load current condition appropriate to an operational capability of a respective one of the switching circuitries.

12. The motor starter of claim 11 wherein the motor starter further comprises a first over-current protection circuitry connected in a parallel circuit with the micro-electromechanical system switching circuitry and the solid state switching circuitry, the first over-current protection circuitry configured to form an electrically conductive path in response to a first switching event of the micro-electromechanical system switching circuitry, said electrically conductive path in a parallel circuit with the micro-electromechanical system switching circuitry for suppressing arc formation between contacts of the micro-electromechanical system switching circuitry during the first switching event.

13. The motor starter of claim 12 wherein the electrically conductive path is formed by way of a balanced diode bridge.

14. The motor starter of claim 13 further comprising a first pulse circuit coupled to the balanced diode bridge of the first over-current protection circuitry, the pulse circuit comprising a pulse capacitor adapted to form a pulse signal for causing flow of a pulse current through the balanced diode bridge, the pulse signal being generated in connection with a turn-on of the micro-electromechanical system switching circuitry to a conductive state, said turn-on constituting the first switching event.

15. The motor starter of claim 13 further comprising a second over-current protection circuitry connected in a parallel circuit with the micro-electromechanical system switching circuitry and the first over-current protection circuitry, the second over protection circuitry configured to form an electrically conductive path in response to a second switching event of the micro-electromechanical system switching circuitry, said electrically conductive path in a parallel circuit with the micro-electromechanical system switching circuitry for suppressing arc formation between contacts of the micro-electromechanical system switching circuitry during the second switching event.

16. The motor starter of claim 15 further comprising a second pulse circuit coupled to the balanced diode bridge, the pulse circuit comprising a pulse capacitor adapted to form a pulse signal for causing flow of a pulse current through the balanced diode bridge, the pulse signal being generated in connection with a turn-off of the micro-electromechanical system switching circuitry to a non-conductive state, said turn-off constituting the second switching event.

17. The motor starter of claim 16 wherein the motor starter further comprises a third over-current protection circuitry connected in a parallel circuit with the micro-electromechanical system switching circuitry, the solid state switching circuitry, and the first and second over-current protection circuitry.

18. The motor starter of claim 17 wherein the third over-current protection circuitry is configured to enable protection against a fault current in the motor connected to the motor starter without having to wait for readiness of the first over-current protection circuitry and second over-current protection circuitry subsequent to respective pulse signals having been just generated by the first pulse and second pulse circuits in connection with the first and second switching events of the micro-electromechanical system switching circuitry.

19. The motor starter of claim 11 wherein the operational capability of the respective switching circuitries is selected from the group consisting of a current handling capacity, a thermal capacity, and a combination of the foregoing.

20. The motor starter of claim 11 wherein the controller is configured to perform arc-less switching of the micro-electromechanical system switching circuitry responsive to a detected zero crossing of an alternating source voltage or alternating load current.

21. The motor starter of claim 11 wherein the controller is configured to perform a soft motor start by switching the solid state switching circuitry in correspondence with a variable phase angle in an alternating source voltage or alternating load current, thereby adjusting an amount of electrical energy resulting from a stream of current pulses for starting the motor.

22. The motor starter of claim 11 wherein the controller is configured to selectively switch a plurality of micro-electromechanical system switches in the micro-electromechanical system switching circuitry to perform at least one of a motor reversing operation and a motor non-reversing operation.

23. A circuit breaker comprising:

micro-electromechanical system switching circuitry; and at least a first over-current protection circuitry connected in a parallel circuit with the micro-electromechanical system switching circuitry, the first over-current protection circuitry configured to momentarily form an electrically conductive path in response to a first switching event of the micro-electromechanical system switching circuitry, said electrically conductive path in a parallel circuit with the micro-electromechanical system switching circuitry for suppressing arc formation between contacts of the micro-electromechanical system switching circuitry during the first switching event;

solid state switching circuitry coupled in a parallel circuit with the micro-electromechanical switching circuitry and the first over-current protection circuitry; and a controller coupled to the electromechanical switching circuitry and the solid state switching circuitry, the controller configured to perform selective switching of a load current from a load connected to the circuit breaker, the selective switching performed between the electromechanical switching circuitry and the solid state switching circuitry in response to a load current to be interrupted by the circuit breaker over a time segment that varies from multiple times longer than a half cycle switching to instantaneous switching based on the magnitude of the load current.

24. The circuit breaker of claim 23 wherein the electrically conductive path is formed by way of a balanced diode bridge.

25. The circuit breaker of claim 24 further comprising a first pulse circuit coupled to the balanced diode bridge, the pulse circuit comprising a pulse capacitor adapted to form a pulse signal for causing flow of a pulse current through the balanced diode bridge, the pulse signal being generated in connection with a turn-on of the micro-electromechanical system switching circuitry to a conductive state, said turn-on constituting the first switching event.

26. The circuit breaker of claim 23 further comprising a second over-current protection circuitry connected in a parallel circuit with the micro-electromechanical system switching circuitry and the first over-current protection circuitry, the second over protection circuitry configured to momentarily form an electrically conductive path in response to a second switching event of the micro-electromechanical system switching circuitry, said electrically conductive path in a parallel circuit with the micro-electromechanical system switching circuitry for suppressing arc formation between contacts of the micro-electromechanical system switching circuitry during the second switching event.

27. The circuit breaker of claim 26 further comprising a second pulse circuit coupled to the balanced diode bridge, the pulse circuit comprising a pulse capacitor adapted to form a pulse signal for causing flow of a pulse current through the balanced diode bridge, the pulse signal being generated in connection with a turn-off of the micro-electromechanical system switching circuitry to a non-conductive state, said turn-off constituting the second switching event.

28. The circuit breaker of claim 23 wherein the controller is configured to perform arc-less switching of the micro-electromechanical system switching circuitry responsive to a detected zero crossing of an alternating source voltage or alternating load current.

* * * * *